US009436547B2

(12) United States Patent
Yeh

(10) Patent No.: US 9,436,547 B2
(45) Date of Patent: Sep. 6, 2016

(54) DATA STORING METHOD, MEMORY CONTROL CIRCUIT UNIT AND MEMORY STORAGE DEVICE

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 165 days.

(21) Appl. No.: 14/492,081

(22) Filed: Sep. 22, 2014

(65) Prior Publication Data

US 2016/0034343 A1    Feb. 4, 2016

(30) Foreign Application Priority Data

Jul. 30, 2014    (TW) .............................. 103125990 A

(51) Int. Cl.
*G06F 11/10*    (2006.01)
*G06F 12/02*    (2006.01)

(52) U.S. Cl.
CPC ....... *G06F 11/1048* (2013.01); *G06F 11/1004* (2013.01); *G06F 11/1068* (2013.01); *G06F 11/1072* (2013.01); *G06F 11/1076* (2013.01); *G06F 12/0246* (2013.01)

(58) Field of Classification Search
CPC ........... G06F 11/1048; G06F 11/1004; G06F 11/1068; G06F 11/1076; G06F 11/1072; G06F 12/0246
USPC .......................... 714/758, 759, 766, 773, 799
See application file for complete search history.

(56) References Cited

U.S. PATENT DOCUMENTS

| | | | | |
|---|---|---|---|---|
| 9,268,634 B2* | 2/2016 | Lin | ..................... | G06F 11/1008 |
| 9,274,891 B2* | 3/2016 | Lin | ..................... | G06F 11/1072 |
| 2008/0155364 A1* | 6/2008 | Hwang | ............... | G11C 11/5642 714/724 |
| 2011/0161565 A1* | 6/2011 | Chua | .................... | G06F 12/0246 711/103 |
| 2012/0166706 A1* | 6/2012 | Pua | ..................... | G06F 12/0246 711/102 |
| 2013/0246732 A1* | 9/2013 | Seng | .................... | G06F 12/0246 711/203 |
| 2013/0304964 A1* | 11/2013 | Chu | ..................... | G06F 12/0246 711/103 |
| 2014/0372667 A1* | 12/2014 | Tan | ..................... | G06F 12/0246 711/103 |
| 2015/0095741 A1* | 4/2015 | Lin | ..................... | G06F 11/1048 714/773 |
| 2015/0113353 A1* | 4/2015 | Tseng | ................. | H03M 13/1105 714/763 |
| 2015/0169401 A1* | 6/2015 | Tseng | ................... | G06F 11/1048 714/773 |
| 2015/0186212 A1* | 7/2015 | Lin | ..................... | G06F 11/1072 714/764 |
| 2015/0293811 A1* | 10/2015 | Lin | ..................... | G06F 11/1008 714/773 |
| 2015/0293814 A1* | 10/2015 | Liang | ................. | G06F 11/1068 714/704 |
| 2016/0011934 A1* | 1/2016 | Hsu | ..................... | G06F 11/1008 714/764 |
| 2016/0020784 A1* | 1/2016 | Tseng | ................. | H03M 13/1128 714/752 |
| 2016/0078951 A1* | 3/2016 | Lin | ..................... | G11C 16/0483 365/185.29 |

* cited by examiner

*Primary Examiner* — John J Tabone, Jr.
(74) *Attorney, Agent, or Firm* — Jianq Chyun IP Office

(57) ABSTRACT

A data storing method, a memory control circuit unit and a memory storage device are provided. The method includes: generating a parity according to first data. The method also includes: when programming the first data into first physical programming unit, programming at least one mark into redundancy bit area of the first physical programming unit. The method further includes: programming the parity into at least one second physical programming unit arranged after the first physical programming unit, and the at least one mark indicates that the parity is programmed into the at least one second physical programming unit.

18 Claims, 13 Drawing Sheets

DATA STORING METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 103125990, filed on Jul. 30, 2014. The entirety of the above-mentioned patent application is hereby incorporated by reference herein and made a part of this specification.

BACKGROUND

1. Technical Field

The present invention relates to a data storing method, and more particularly, relates to a data storing method for a rewritable non-volatile memory and a memory control circuit unit and a memory storage device using the method.

2. Description of Related Art

The growth of digital cameras, mobile phones, and MP3 players has been rapid in recent years. Consequently, the consumers' demand for storage media has increased tremendously. In recent years, a rewritable non-volatile memory has become an import part of the electronic industries because the rewritable non-volatile memory is capable of providing features such as data non-volatility, low power consumption, small volume, non-mechanical structure and high read/write speed. For instance, a solid-state drive utilizing a flash memory as a storage media has been widely applied in a computer host as a main hard disk for enhancing access efficiency of computer.

Data stored in the rewritable non-volatile memory may generate error bits due various factors (e.g., current leakage, programming failures and damages on the memory cell, and etc.). Therefore, an error checking and correcting circuit is generally disposed in a memory storage system to generate an error checking and correcting code for the stored data in order to ensure data correctness. However, when the number of the error bits exceeds the number of the error bits that can be detected and corrected by the error checking and correcting circuit, the data containing the error bits cannot be corrected to cause loss of data. Generally, in aforementioned condition, the data can still be corrected according to a parity that is stored in the rewritable non-volatile memory and corresponding to the data to be corrected. Traditionally, the data in a data bit area and a redundancy bit area of physical programming units where the parity is located is also calculated from other data under protections. Accordingly, information in the redundancy bit area cannot be used to ensure that the physical programming units are the physical programming units where the parity is located. Therefore, in a traditional method, the parity is placed at fixed positions.

For example, assuming that the memory storage system has eight memory dies, the last one among the memory dies can be used to store the parity. If the data from a host system only requires to be written into one physical programming unit, in order to generate the parity to be stored in the corresponding physical programming units of an eighth memory die, dummy data needs to be filled into the corresponding physical programming units in other six memory dies. In other words, this method results in waste of storage spaces in a memory storage device. Accordingly, it is one of the major subjects in the industry as how to avoid waste of the storage spaces in the memory storage device while improving correcting capability and performance in error collections.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data storing method, a memory control circuit unit and a memory storage device, which are capable of effectively preventing waste of storage spaces in the memory storage device and correcting error bits of data according to stored parity when the error bits of the data cannot be corrected by the error checking and correcting code, so as to improve correcting capability.

A data storing method for a rewritable non-volatile memory module is provided according to exemplary embodiments of the present invention. The rewritable non-volatile memory module includes a plurality of physical erasing units, and each of the physical erasing units includes a plurality of physical programming units. Each of the physical programming units includes a data bit area and a redundancy bit area. The data storing method includes: generating a parity according to first data; programming the first data into a first physical programming unit among the physical programming units; and programming the parity into at least one second physical programming unit among the physical programming units, wherein the at least one second physical programming unit is arranged after the first physical programming unit. The step of programming the first data into the first physical programming unit among the physical programming units includes: programming at least one mark into the redundancy bit area of the first physical program unit, wherein the at least one mark indicates that the parity is programmed into the at least one second physical programming unit.

A data storing method for a rewritable non-volatile memory module is provided according to exemplary embodiments of the present invention. The rewritable non-volatile memory module includes a plurality of physical erasing units, and each of the physical erasing units includes a plurality of physical programming units. Each of the physical programming units includes a data bit area and a redundancy bit area. The data storing method includes: establishing a parity address correspondence table; generating a parity according to first data; programming the first data into a first physical programming unit among the physical programming units; programming the parity into at least one second physical programming unit among the physical programming units; and recording at least one mark into the parity address correspondence table, wherein the at least one mark indicates that the parity is programmed into the at least one second physical programming unit.

An exemplary embodiment of the invention provides a memory control circuit unit configured to control a rewritable non-volatile memory module. The rewritable non-volatile memory module includes a plurality of physical erasing units, and each of the physical erasing units includes a plurality of physical programming units. Each of the physical programming units includes a data bit area and a redundancy bit area. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to generate a parity according to first data and program the first data into a first physical programming unit among the physical programming units. The memory management circuit is further configured to program the parity into at least one second physical programming unit among the physical programming units. The at least one second physical programming unit is arranged after the first physical programming unit. In the operation of programming the first data into the first physical programming unit among the physical programming units, the memory management circuit programs at least one mark into the redundancy bit area of the first physical programming unit, wherein the at least one mark indicates that the parity is programmed into the at least one second physical programming unit.

An exemplary embodiment of the invention provides a memory storage device, which includes a connection interface unit, a rewritable non-volatile memory module and a memory control circuit unit. The connection interface unit is configured to couple to a host system. The rewritable non-volatile memory module includes a plurality of physical erasing units, and each of the physical erasing units includes a plurality of physical programming units. Each of the physical programming units includes a data bit area and a redundancy bit area. The memory control circuit unit is coupled to the connection interface unit and the rewritable non-volatile memory module, and configured to generate a parity according to first data and program the first data into a first physical programming unit among the physical programming units. In addition, the memory control circuit unit is further configured to program the parity into at least one second physical programming unit among the physical programming units, wherein the at least one second physical programming unit is arranged after the first physical programming unit. In the operation of programming the first data into the first physical programming unit among the physical programming units, the memory control circuit unit programs at least one mark into the redundancy bit area of the first physical program unit, wherein the at least one mark indicates that the parity is programmed into the at least one second physical programming unit.

Based on above, when errors exist in the data bits read from the rewritable non-volatile memory module, an exemplary embodiment of the invention is capable of rapidly obtaining the address of the physical programming unit where the parity is located according to the at least one mark recorded in the physical programming units. Accordingly, the data storing method, the memory control circuit unit and the memory storage device as proposed by the exemplary embodiments of the invention are capable of effectively improving the correcting capability and performance in error collections.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
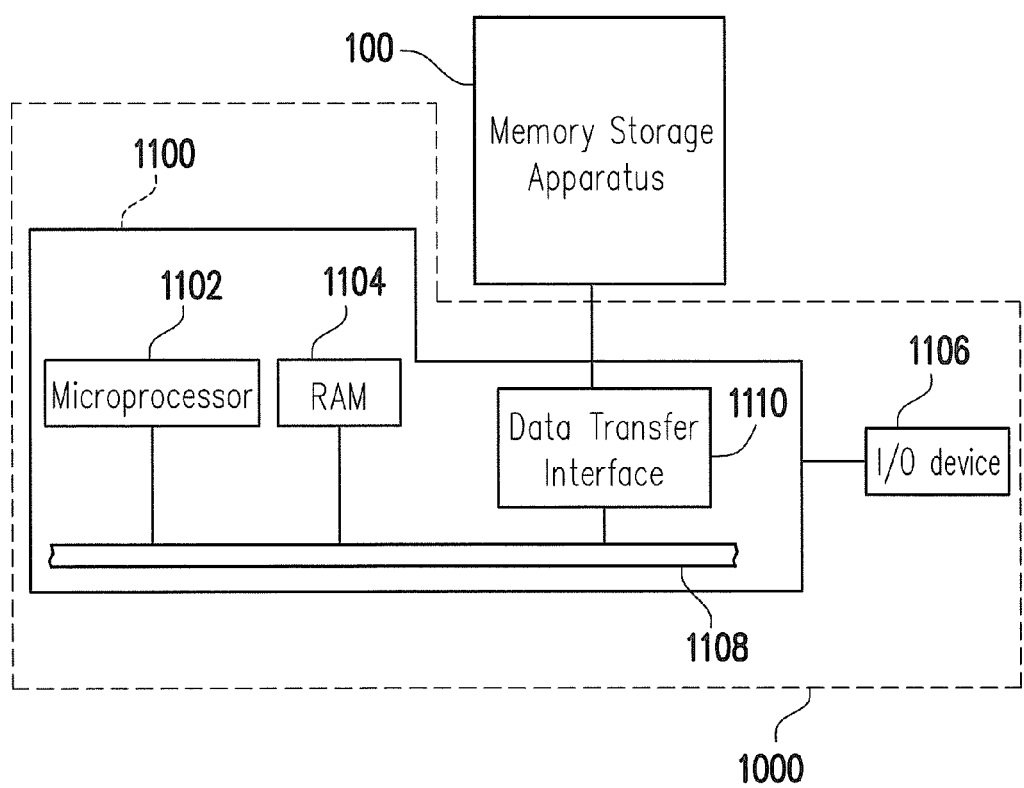
FIG. 1A is a schematic diagram of a host system and a memory storage device according to a first exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

[First Exemplary Embodiment]

Generally, a memory storage device (also known as a memory storage system) includes a rewritable non-volatile memory module and a controller (also known as a control circuit). The memory storage device is usually configured together with a host system so that the host system may write data to or read data from the memory storage device.

FIG. 1A is a schematic diagram of a host system and a memory storage device according to the first exemplary embodiment.

Figure 1B:
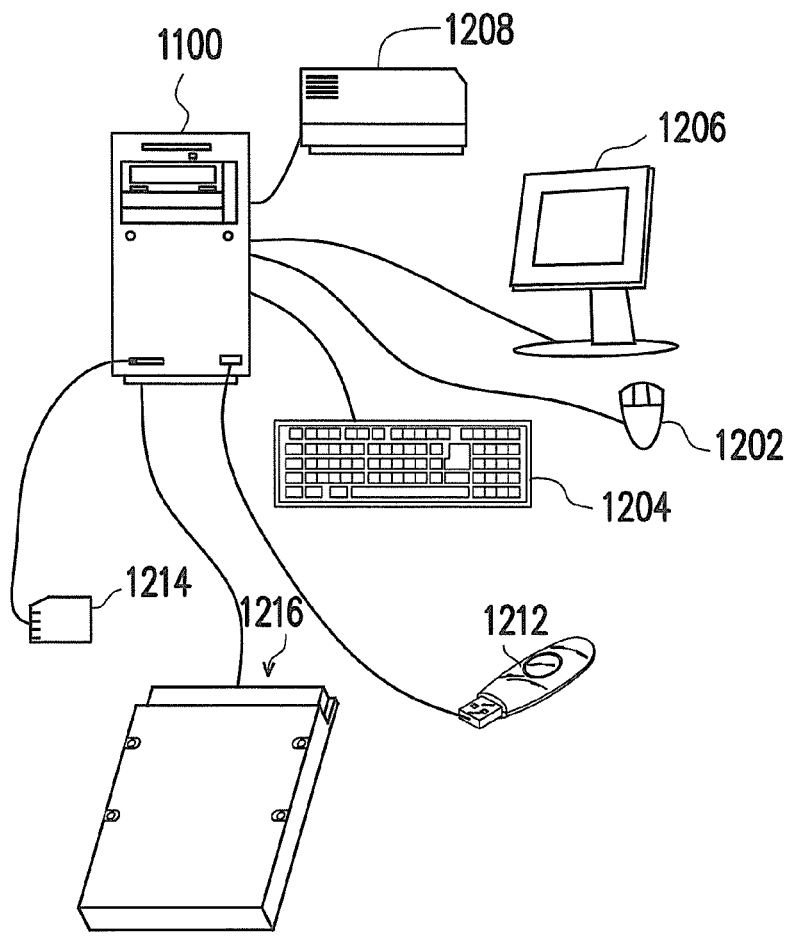
FIG. 1B is a schematic diagram of a computer, an input/output device, and a memory storage device according to the first exemplary embodiment.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206 and a printer 1208 as shown in FIG. 1B. It should be understood that the devices illustrated in FIG. 1B are not intended to limit the I/O device 1106, and the I/O device 1106 may further include other devices.

In the present embodiment of the invention, the memory storage device 100 is electrically connected to other devices of the host system 1000 through the data transmission interface 1110. By using the microprocessor 1102, the random access memory 1104 and the Input/Output (I/O) device 1106, data may be written into the memory storage device 100 or may be read from the memory storage device 100. For example, the memory storage device 100 may be a rewritable non-volatile memory storage device such as a flash drive 1212, a memory card 1214, or a solid state drive (SSD) 1216 as shown in FIG. 1B.

Figure 1C:
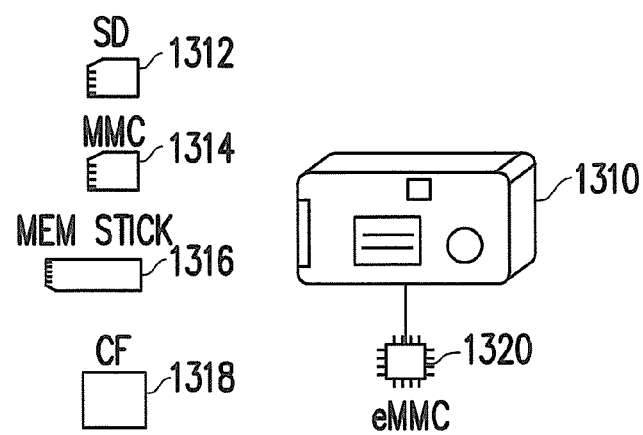
FIG. 1C is a schematic diagram of a host system and a memory storage device according to the first exemplary embodiment.

Generally, the host system 1000 may substantially be any system capable of cooperating with the memory storage device 100 for storing data. Although the host system 1000 is described by using a computer system for example in the present exemplary embodiment, in another exemplary embodiment of the invention, the host system 1000 may be a digital camera, a video camera, a telecommunication device, an audio player, or a video player. For example, if the host system is a digital camera (video camera) 1310 depicted in FIG. 1C, the rewritable non-volatile memory storage device may be a SD card 1312, a MMC card 1314, a memory stick 1316, a CF card 1318 or an embedded storage device 1320 (as shown in FIG. 1C). The embedded storage device 1320 includes an embedded MMC (eMMC). It should be mentioned that the eMMC is electrically connected to a substrate of the host system, directly.

Figure 2:
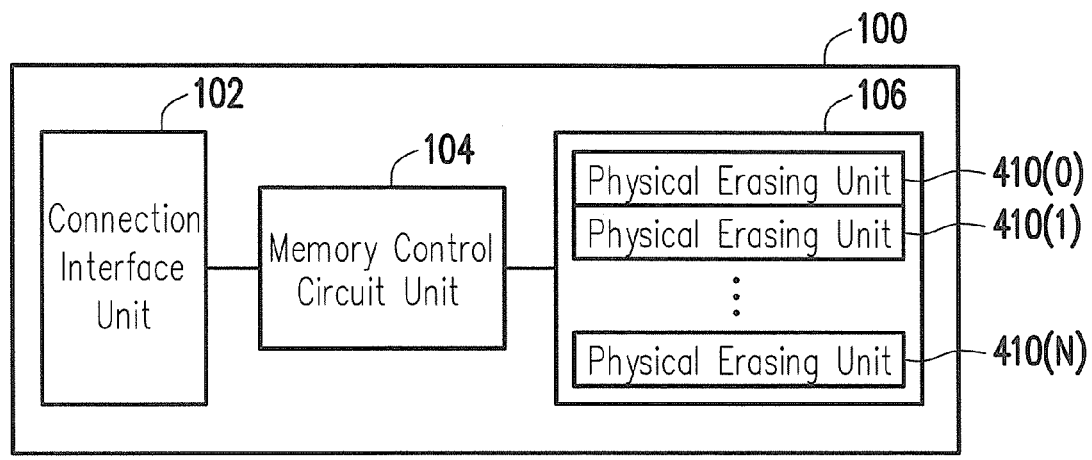
FIG. 2 is a schematic block diagram illustrating the memory storage device depicted in FIG. 1A.

FIG. 2 is a schematic block diagram illustrating the memory storage device depicted in FIG. 1A.

Referring to FIG. 2, the memory storage device 100 includes a connection interface unit 102, a memory control circuit unit 104 and a rewritable non-volatile memory module 106.

In the present exemplary embodiment, the connection interface unit 102 is compatible with a serial advanced technology attachment (SATA) standard. However, the present invention is not limited thereto, and the connection interface unit 102 may also be compatible with Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) interface standard or other suitable standards. In the present exemplary embodiment, the connector and the memory control circuit unit may be packaged into one chip, or distributed outside of a chip containing the memory control circuit unit.

The memory control circuit unit 104 is configured to execute a plurality of logic gates or control commands which are implemented in a hardware form or in a firmware form, so as to perform operations of writing, reading, erasing and merging data in the rewritable non-volatile memory module 106 according to the commands of the host system 1000.

The rewritable non-volatile memory module 106 is coupled to the memory control circuit unit 104 and configured to store data written from the host system 1000. The rewritable non-volatile memory module 106 has multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Additionally, each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 4 physical access addresses, and the size of each physical access address is 512 bytes. However, in other exemplary embodiments, more or less number of the physical access addresses may also be contained in the data bit area, and amount and size of the physical access addresses are not limited in the present invention. For example, in an exemplary embodiment, the physical erasing unit is a physical block, and the physical programming unit is a physical page or a physical sector, but the present invention is not limited thereto.

In the present exemplary embodiment, the rewritable non-volatile memory module 106 is a Multi Level Cell (MLC) NAND flash memory module (i.e., a flash memory module capable of storing two bits of data in one memory cell). However, the invention is not limited thereto. The rewritable non-volatile memory module 106 may also be a Single Level Cell (SLC) NAND flash memory module, (i.e., a flash memory module capable of storing one bit of data in one memory cell), a Trinary Level Cell (TLC) NAND flash memory module (i.e., a flash memory module capable of storing three bits of data in one memory cell), other flash memory modules or any memory module having the same features.

Figure 3:
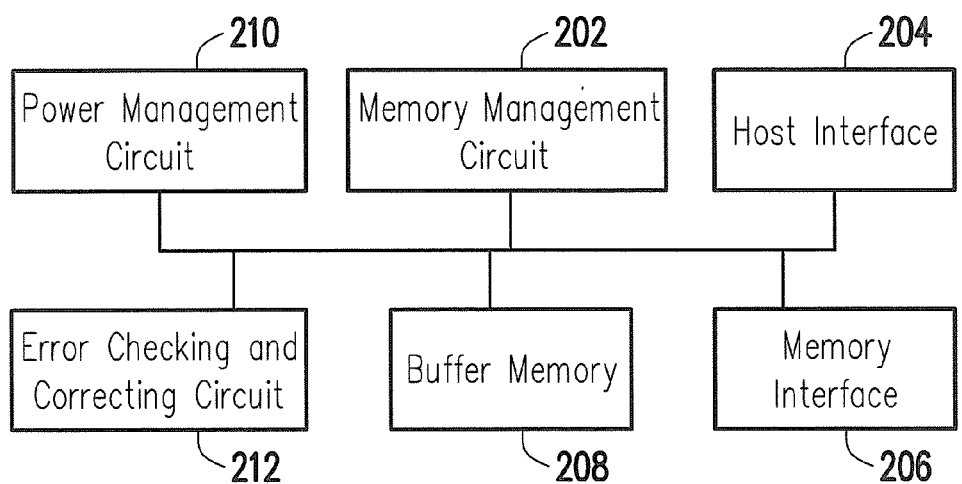
FIG. 3 is a schematic block diagram illustrating a memory control circuit unit according to the first exemplary embodiment.

FIG. 3 is a schematic block diagram illustrating a memory control circuit unit according to the first exemplary embodiment.

Referring to FIG. 3, the memory control circuit unit 104 includes a memory management circuit 202, a host interface 204 and a memory interface 206.

The memory management circuit 202 is configured to control overall operations of the memory control circuit unit 104. Specifically, the memory management circuit 202 has a plurality of control instructions. During operations of the memory storage device 100, the control instructions are executed to perform various operations such as writing, reading and erasing data.

In the present exemplary embodiment, the control instructions of the memory management circuit 202 are implemented in a form of a firmware. For instance, the memory management circuit 202 has a microprocessor unit (not illustrated) and a ROM (not illustrated), and the control commands are burned into the ROM. When the memory storage device 100 operates, the control commands are executed by the microprocessor to perform operations of writing, reading or erasing data.

In another exemplary embodiment, the control instructions of the memory management circuit 202 may also be stored as program codes in a specific area (for example, a system area in a memory module that is dedicated for storing system data) of the rewritable non-volatile memory module 106. In addition, the memory management circuit 202 has a microprocessor unit (not illustrated), a ROM (not illustrated) and a RAM (not illustrated). Particularly, the ROM has a boot code, which is executed by the microprocessor unit to load the control commands stored in the rewritable non-volatile memory module 106 to the RAM of the memory management circuit 202 when the memory control circuit unit 104 is enabled. Thereafter, the control commands are executed by the microprocessor unit to perform operations of writing, reading or erasing data.

Moreover, the control instructions of the memory management circuit 202 may also be implemented in a hardware form according to another exemplary embodiment of the invention. For instance, the memory management circuit 202 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are electrically to the microcontroller. The memory cell management circuit is configured to manage physical erasing units of the rewritable non-volatile memory module 106. The memory writing circuit is configured to issue a write command to the rewritable non-volatile memory module 106 for writing data thereto. The memory reading circuit is configured to issue a read command to the rewritable non-volatile memory module 106 for reading data therefrom. The memory erasing circuit is configured to issue an erase command to the rewritable non-volatile memory module 106 for erasing data therefrom. The data processing circuit is configured to process data to be written to the rewritable non-volatile memory module 106 or data read from the rewritable non-volatile memory module 106.

The host interface 204 is coupled to the memory management circuit 202 and configured to couple to the connection interface unit 102, so as to receive and identify commands and data sent from the host system 1000. In other words, the commands and the data sent from the host system 1000 are passed to the memory management circuit 202 through the host interface 204. In the present exemplary embodiment, the host interface 204 is compatible with a SATA standard. However, it should be understood that the present invention is not limited thereto, and the host interface 204 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 206 is coupled to the memory management circuit 202 and configured to access the rewritable non-volatile memory module 106. In other words, data to be written to the rewritable non-volatile memory module 106 is converted to a format acceptable to the rewritable non-volatile memory module 106 through the memory interface 206.

In an exemplary embodiment, the memory control circuit unit 104 further includes a buffer memory 208, a power management circuit 210 and an error checking and correcting circuit 212.

The buffer memory 208 is coupled to the memory management circuit 202 and configured to temporarily store data and commands from the host system 1000 or data from the rewritable non-volatile memory module 106.

The power management unit 210 is coupled to the memory management circuit 202 and configured to control a power of the memory storage device 100.

The error checking and correcting circuit 212 is coupled to the memory management circuit 202 and configured to perform an error checking and correcting process to ensure the correctness of data. Specifically, when the memory management circuit 202 receives a write command from the host system 1000, the error checking and correcting circuit 212 generates an error checking and correcting code (ECC code) for data corresponding to the write command, and the memory management circuit 202 writes data and the ECC code corresponding to the write command to the rewritable non-volatile memory module 106. Next, when reading data from the rewritable non-volatile memory module 106, the memory management circuit 202 also reads the ECC code corresponding to such data, and the error checking and correcting circuit 212 performs the error checking and correcting process on the read data based on the read ECC code.

Figure 4A:
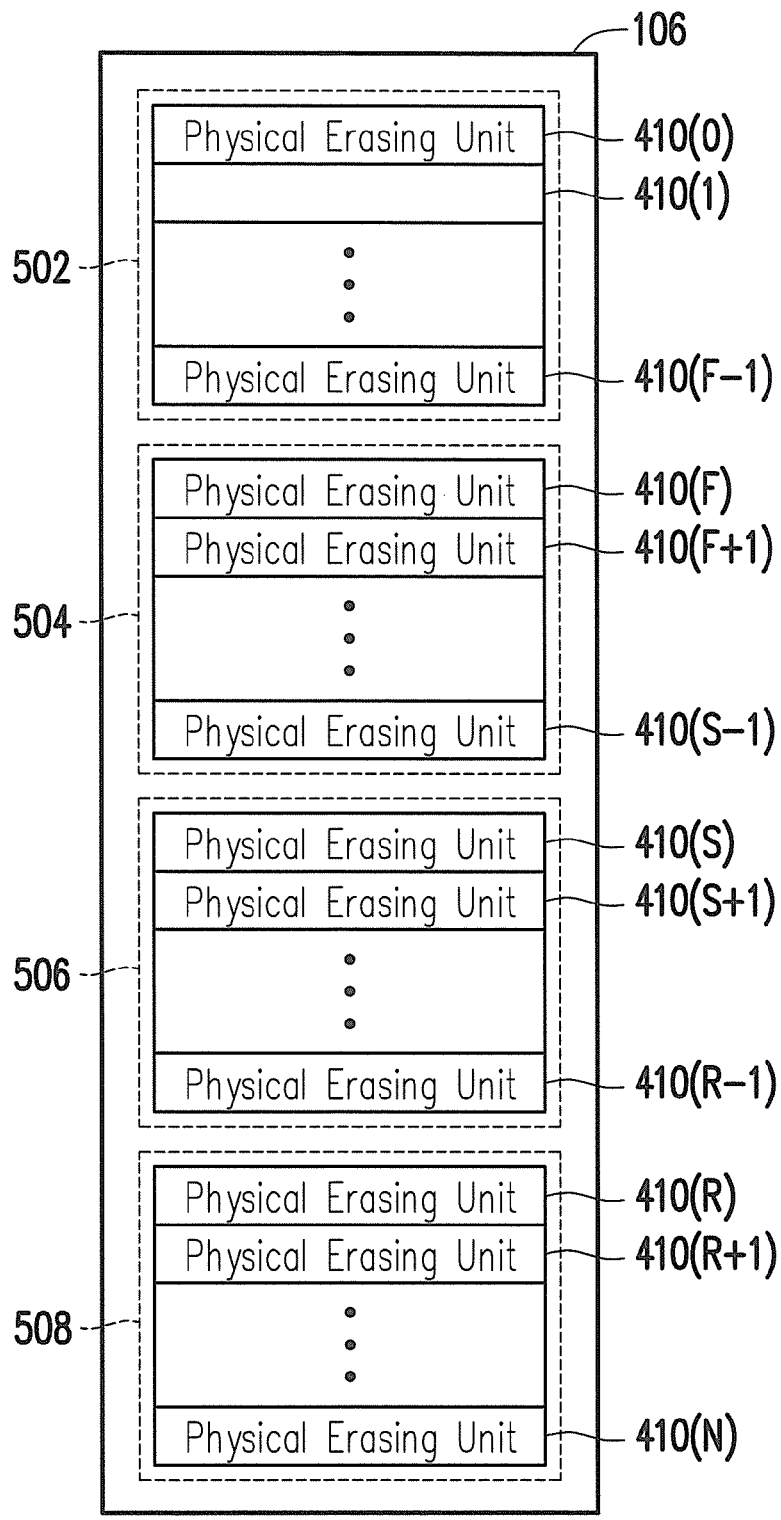
FIG. 4A and FIG. 4B are schematic diagrams illustrating a management of physical erasing units according to the first exemplary embodiment.
Figure 4B:
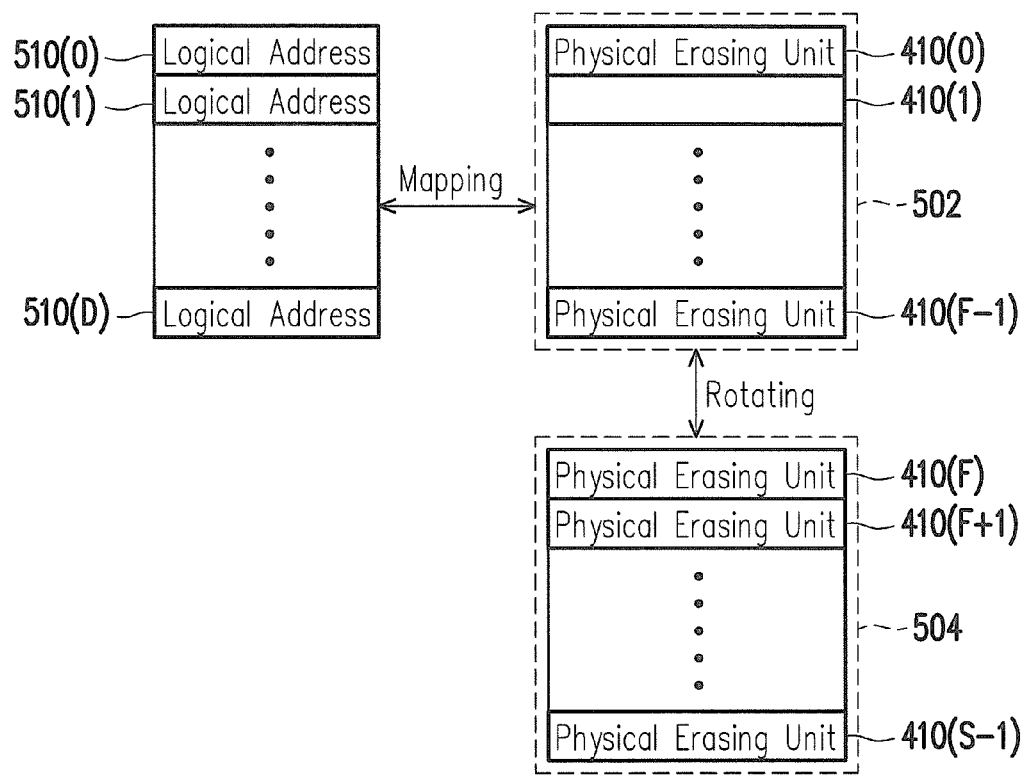

FIG. 4A and FIG. 4B are schematic diagrams illustrating a management of physical erasing units according to the first exemplary embodiment.

It should be understood that terms, such as "select", "group", "divide", "associate" and so forth, are logical concepts which describe operations in the physical erasing units of the rewritable non-volatile memory module 106. That is, the physical erasing units of the rewritable non-volatile memory module are logically operated, but actual positions of the physical units of the rewritable non-volatile memory module are not changed.

Referring to FIG. 4A, the memory control circuit unit 104 (or the memory management circuit 202) may logically group the physical erasing units 410(0) to 410(N) into a data area 502, a spare area 504, a system area 506 and a replacement area 508.

The physical erasing units logically belonging to the data area 502 and the spare area 504 are configured to store data from the host system 1000. More specifically, the physical erasing units of the data area 502 are regarded as the physical erasing units stored with the data, whereas the physical erasing units of the spare area 504 are configured to replace the physical erasing units of the data area 502. In other words, when the write command and the data to be written are received from the host system 1000, the memory management unit 202 selects the physical erasing units from the spare area 504, and writes the data into the selected physical erasing units in order to replace the physical erasing units in the data area 502.

The physical erasing units logically belonging to the system area 506 are configured to record system data. For example, the system data includes information related to manufacturer and model of the rewritable non-volatile memory module, a number of physical erasing units in the rewritable non-volatile memory module, a number of the physical programming units in each physical erasing unit, and so forth.

The physical erasing units logically belonging to the replacement area 508 are used in a bad physical erasing unit replacement procedure for replacing damaged physical erasing units. More specifically, if available physical erasing units are still present in the replacement area 508 when the physical erasing units of the data area 502 are damaged, the memory management circuit 202 selects the available physical erasing units from the replacement area 508 for replacing the damaged physical erasing units.

In particular, the numbers of the physical erasing units in the data area 502, the spare area 504, the system 506 and the replacement area 508 may be different from one another according to the different memory specifications. In addition, it should be understood that, during operations of the memory storage device 100, grouping relations of the physical erasing units for associating with the data area 502, the spare area 504, the system area 506, and replacement area 508 may be dynamically changed. For example, when the damaged physical erasing units in the spare area 504 are replaced by the physical erasing units in the replacement area 508, the physical erasing units originally from the replacement area 508 are then associated with the spare area 504.

Referring to FIG. 4B, as described above, the physical erasing units of the data area 502 and the spare area 504 are configured for storing data written from the host system 1000 in an alternating manner. In the present exemplary embodiment, the memory control circuit unit 104 (or the memory management circuit 202) may assign logical addresses 510(0) to 510(D) to the host system 1000 for mapping a part of physical erasing units 410(0) to 410(F−1), so as to facilitate in data access on the physical erasing units which store the data in the alternating manner. Particularly, the host system 1000 may access the data in the data area 502 through the logical addresses 510(0) to 510(D). Further, the memory control circuit unit 104 (or the memory management circuit 202) establishes a logical-physical mapping table to record a mapping relation between the logical addresses and the physical erasing units. The logical-physical mapping table may also record, for example, various corresponding relations between logical and physical entities, such as a mapping relation between the logical addresses and the physical programming units, a mapping relation between the logical programming units and the physical programming units and/or a mapping relation between the logical programming units and the physical erasing units, which are not particularly limited by the invention.

Figure 5A:
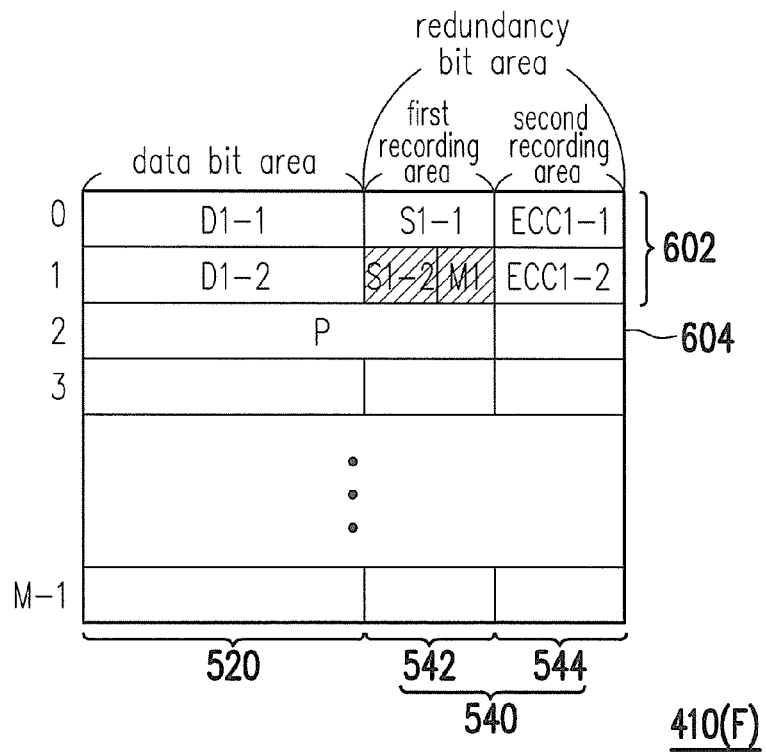
FIG. 5A and FIG. 5B illustrate an example of writing a writing data, an error checking and correcting code corresponding to the writing data and at least one mark for recording a parity into the physical programming units according to the first exemplary embodiment.
Figure 5B:
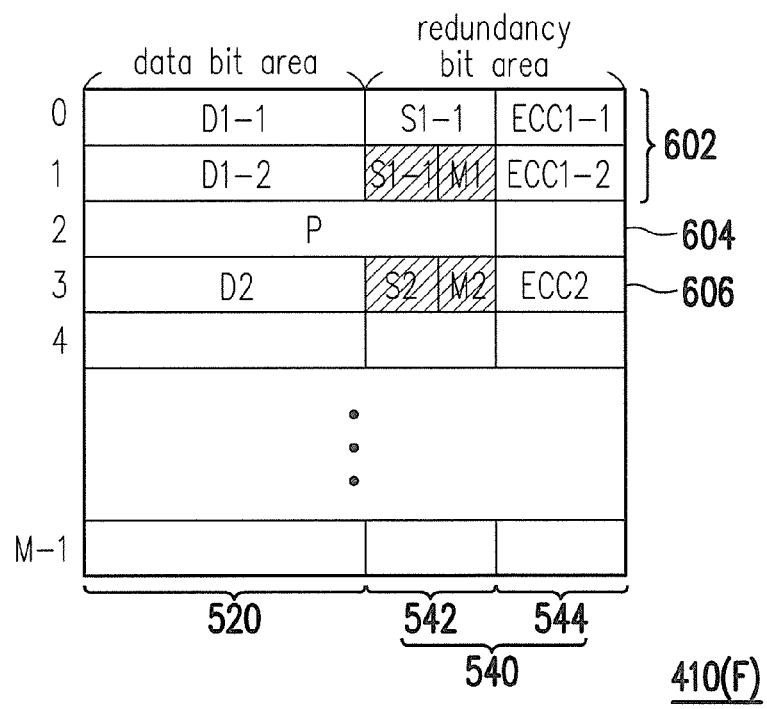

FIG. 5A and FIG. 5B illustrate an example of writing a writing data, an error checking and correcting code corresponding to the writing data and at least one mark for recording a parity into the physical programming units according to the first exemplary embodiment.

Referring to FIG. 5A, in the present exemplary embodiment, each of the physical programming units includes a data bit area 520 and a redundancy bit area 540. The redundancy bit area 540 includes a first recording area 542 and a second recording area 544. For instance, when a capacity of one physical programming unit is 8 Kilobyte (KB), a capacity of redundancy bit area 540 is 22 Byte.

Specifically, when the host system 1000 sends a write command and first user data D1 corresponding to that write command to the memory storage devices 100, the memory control circuit unit 104 (or the memory management circuit 202) determines a size of the first user data D1, and obtains an amount of the physical programming units required for writing the first user data D1 according to the size of the first user data D1. Herein, it is assumed that two physical programming units are required for writing the first user data D1. Accordingly, as shown in FIG. 5A, the memory control circuit unit 104 (or the memory management circuit 202) generates error checking and correcting codes ECC1-1 and ECC1-2 corresponding to first user data D1-1 and D1-2 and management information S1-1 and S1-2 (e.g., a mark that indicate whether the physical programming units are normal or bad) corresponding to the first user data D1-1 and D1-2, and selects the physical erasing unit 410(F) from the spare area 504 to serve as a substitute physical programming. Thereafter, the memory control circuit unit 104 (or the memory management circuit 202) sequentially writes the first user data, the management information corresponding to the first user data and the error checking and correcting codes corresponding to the first user data into $0^{th}$ and $1^{st}$ physical programming units of the physical erasing unit 410(F). Herein, it is assumed that the physical programming units written by the first user data are a first physical programming unit 602. In other words, the first user data D1-1 and D1-2 are programmed into the data bit area 520 of the first physical programming unit 602, and the error checking and correcting codes ECC1-1 and ECC1-2 corresponding to the first user data are programmed into the second recording area 544 of the redundancy bit area 540 of the first physical programming unit 602. Particularly, when the host system 1000 intends to read the first user data D1 from the memory storage device 100, the memory control circuit unit 104 (or the memory management circuit 202) reads the error checking and correcting codes ECC1-1 and ECC1-2 from the first physical programming unit 602, and the error checking and correcting circuit 212 performs the error checking and correcting procedure on the first user data D1-1 and D1-2 according to the error checking and correcting codes ECC1-1 and ECC1-2, respectively. Accordingly, within an error correcting capability of the error checking and correcting circuit 212, the error checking and correcting circuit 212 is capable of correcting the error bits in the data, so as to ensure data correctness.

In the present exemplary embodiment, it assumed that first data includes the first user data and management information corresponding to the first user data. Accordingly, after the memory storage device 100 receives the first user data and generates the management information S1-1 and S1-2 corresponding to the first user data D1-1 and D1-2, the memory control circuit unit 104 (or the memory management circuit 202) generates a parity P according to the first data (i.e., the first user data D1-1 and D1-2 and the management information S1-1 and S1-2 corresponding to the first user data D1-1 and D1-2). Further, in another exemplary embodiment, the first data includes user data, management information corresponding to the user data and an error checking and correcting code corresponding to the user data. In other words, the memory control circuit unit 104 (or the memory management circuit 202) generates the parity according to entire data stored in the physical programming units. For example, the memory control circuit unit 104 (or the memory management circuit 202) generates the parity according to the first user data D1-1 and D1-2, the management information S1-1 and S1-2 corresponding to the first user data D1-1 and D1-2 and the error checking and correcting codes ECC1-1 and ECC1-2 corresponding to the first user data D1-1 and D1-2. It is worth mentioning that, in the present exemplary embodiment, the first data is composed of two first user data and the management information corresponding to the two first user data (i.e., the first user data D1-1 and D1-2 and the management information S1-1 and S1-2 corresponding to the first user data D1-1 and D1-2). Nonetheless, the invention is not intended to limit a size of the first data. For example, in another exemplary embodiment, the first data may also be composed of one or more first user data and the management information corresponding to the first user data, or composed of one or more first user data, the management information corresponding to the first user data and the error checking and correcting code corresponding to the first user data. It should be noted that, the invention is not intended to limit a time point and a method for generating the parity. Specifically, in the present exemplary embodiment, the generated parity may be a parity checking code, a channel coding or other types of the parity. For example, the other types of the parity include a hamming code, a low density parity code (LDPC code), a turbo code, or a Reed-solomon code (RS code). Particularly, in another exemplary embodiment, the memory control circuit unit 104 (or the memory management circuit 202) may also generate the parity for the first data by using an exclusive OR (XOR) operation.

Referring back to FIG. 5A, the memory control circuit unit 104 (or the memory management circuit 202) programs the parity P into a $2^{nd}$ physical programming unit (i.e., a second physical programming unit 604) among the physical programming units of the physical erasing unit 410(F). It is worth mentioning that, in aforesaid operation of programming the first user data, the management information corresponding to the first user data and the error checking and correcting code corresponding to the first user data into the first physical programming unit 602 among the physical programming units, the memory control circuit unit 104 (or the memory management circuit 202) programs at least one mark into the first recording area 542 of the redundancy bit area of the $1^{st}$ physical programming unit of the physical erasing unit 410(F) (i.e., a first mark M1 depicted in FIG. 5A). The first mark M1 indicates that the parity P is programmed into the second physical programming unit 604 of the physical erasing unit 410(F).

Particularly, the second physical programming unit 604 is arranged after a last one physical programming unit of the first physical programming unit 602, and the first mark M1 indicates that the parity P is stored in the second physical programming unit 604.

Referring to FIG. 5B, when the host system 1000 sends another write command and second user data D2 corresponding to that write command to the memory storage devices 100, the memory control circuit unit 104 (or the memory management circuit 202) also determines a size of the second user data D2, and obtains an amount of the physical programming units required for writing the second user data D2 according to the size of the second user data D2. Herein, it is assumed that only one physical programming unit is required for writing the second user data D2. Accordingly, as shown in FIG. 5B, the memory management circuit 202 generates an error checking and correcting code ECC2 corresponding to the second user data D2 and management information S2 corresponding to the second user data D2. Thereafter, the memory control circuit unit 104 (or the memory management circuit 202) writes the second user data, the management information corresponding to the second user data and the error checking and correcting code corresponding to the second user data into a $3^{rd}$ physical programming unit (i.e., a third physical programming unit 606) of the physical erasing unit 410(F). While the memory control circuit unit 104 (or the memory management circuit 202) is writing the management information S2 corresponding to the second user data D2 into the third physical programming unit 606 of the physical erasing unit 410(F), the memory control circuit unit 104 (or the memory management circuit 202) programs a second mark M2 into the first recording area 542 of the redundancy bit area 540 of the third physical programming unit 606. The third physical programming unit 606 is arranged after the second physical programming unit 604, and the second mark M2 indicates that the parity P is stored in the second physical programming unit 604.

Thereafter, when the memory control circuit unit 104 (or the memory management circuit 202) receives a read command from the host system 1000 for reading the first user data D1, the memory control circuit unit 104 (or the error checking and correcting circuit 212) may perform aforesaid error checking and correcting procedure on the read first user data D1-1 and D1-2 according to the read error checking and correcting codes. For example, in the present exemplary embodiment, the first data includes a second data and an error checking and correcting code. The second data may only include the first user data, or include both the first user data and the management information corresponding to the first user data, and the error checking and correcting code is corresponding to the first user data. When the second data cannot be corrected by using the error checking and correcting code corresponding to the first user data, the memory control circuit unit 104 (or the memory management circuit 202) may obtain an address of at least one second physical programming unit recording the parity according to the at least one mark, read the parity from the at least one second physical programming unit, and correct the second data according the read parity. For example, if the first user data D1-1 and D1-2 cannot be corrected by using the error checking and correcting code (i.e., ECC1-1, ECC1-2) corresponding to the first user data D1-1 and D1-2, the memory control circuit unit 104 (or the memory management circuit 202) may obtain the address of the second physical programming unit 604 recording the parity P according to the at least one mark, read the parity P from the second physical programming unit 604, and correct the first user data D1-1 according the read parity P. For example, when the first user data D1-1 cannot be corrected by using the error checking and correcting code ECC1-1 of the first user data D1-1, the memory control circuit unit 104 (or the memory management circuit 202) first obtains the first mark M1 from the physical programming unit adjacent to the $0^{th}$ physical programming unit where the first user data D1-1 is located (e.g., the $1^{st}$ physical programming unit of the physical erasing unit 410(F)) of the first physical programming units 602, and thereby identifies the address for storing the parity P. In another exemplary embodiment, if the first user data D1-2 cannot be corrected by using the error checking and correcting code ECC1-2 of the first user data D1-2 and the first mark M1 cannot be obtained from the first recording area of the redundancy bit area corresponding to the first user data D1-2, the memory control circuit unit 104 (or the memory management circuit 202) searches the physical programming unit adjacent to the $1^{st}$ physical programming unit where the first user data D1-2 is located (e.g., the $0^{th}$ physical programming unit of the physical erasing unit 410(F), the second physical programming unit 604 and the third physical programming unit 606) in order to obtain the second mark M2 located in the third physical programming unit 606, and thereby identifies the address of the physical programming unit storing the parity P.

In the present exemplary embodiment, the rewritable non-volatile memory module 106 is the Multi Level Cell (MLC) NAND flash memory module. Accordingly, each memory cell is capable of storing multiple bits. Specifically, when programming the memory cells of the Single Level Cell (MLC) NAND memory module, the memory cells can only be programmed in single level. Accordingly, each memory cell is only capable of storing one bit. The physical erasing unit of the MLC NAND flash memory module may be programmed in multi levels. Taking a 2 level cell NAND flash memory as an example, the physical programming units thereof are programmed in two phases. The first phase refers to writing of lower physical programming units, and a physical characteristic thereof is similar to that of the single level cell (SLC) NAND flash memory. Data is written into upper physical programming units only after the first phase is completed, wherein a writing speed of the lower physical programming units is faster than that of the upper physical programming units. Therefore, the physical programming units of each physical erasing unit can be divided into a slow physical programming unit (i.e., the upper physical programming units) and a fast physical programming unit (i.e., the lower physical programming units).

Figure 6:
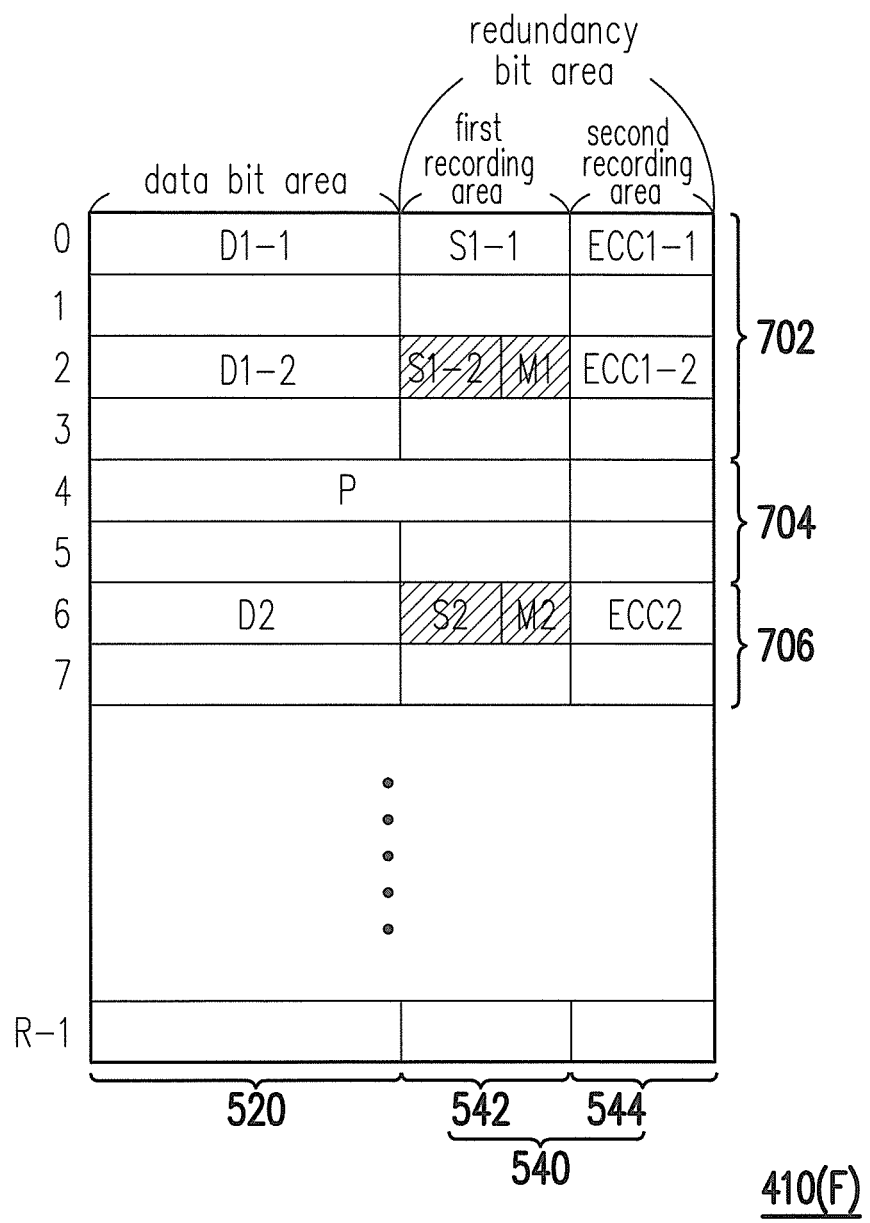
FIG. 6 illustrates another example of writing the writing data, the error checking and correcting code corresponding to the writing data and the at least one mark for recording the parity into the physical programming units according to the first exemplary embodiment.

FIG. 6 illustrates another example of writing the writing data, the error checking and correcting code corresponding to the writing data and the at least one mark for recording the parity into the physical programming units according to the first exemplary embodiment.

In another exemplary embodiment, the memory control circuit unit 104 (or the memory management circuit 202) may program the first user data D1-1 and D1-2, the management information S1-1 and S1-2 corresponding to the first user data D1-1 and D1-2 and the error checking and correcting codes ECC1-1 and ECC1-2 into a plurality of physical programming units among the physical programming units. For example, the memory control circuit unit 104 (or the memory management circuit 202) only programs the first user data D1-1 and D1-2, the management information S1-1 and S1-2 corresponding to the first user data D1-1 and D1-2 and the error checking and correcting codes ECC1-1 and ECC1-2 corresponding to the first user data D1-1 and D1-2 into the fast physical programming unit of a first physical programming unit 702. Accordingly, as shown in FIG. 6, the memory control circuit unit 104 (or the memory management circuit 202) programs the first user data D1-1, the management information S1-1 and the error checking and correcting code ECC1-1 into the $0^{th}$ physical programming unit of the physical erasing unit 410(F), and programs the first user data D1-2, the management information S1-2, the first mark M1 and the error checking and correcting code ECC1-2 into the $2^{nd}$ physical programming unit of the physical erasing unit 410(F). In addition, the memory control circuit unit 104 (or the memory management circuit 202) generates the parity P corresponding to the first user data D1-1 and D1-2 and the management information S1-1 and S1-2 corresponding to the first user data D1-1 and D1-2, and writes the parity P into the fast physical programming unit of a second physical programming unit 704 (i.e., a $4^{th}$ physical programming unit of the physical erasing unit 410(F)). Thereafter, when the host system 1000 sends another write command and the second user data D2 corresponding to that write command to the memory storage device 100, the memory control circuit unit 104 (or the memory management circuit 202) writes the generated error checking and correcting code ECC2 corresponding to the second user data D2, the management information S2 corresponding to the second user data D2 and the second mark M2 into the fast physical programming unit of a third physical programming unit 706 of the physical erasing unit 410(F) (i.e., a $6^{th}$ physical programming unit of the physical erasing unit 410(F)). Herein, as similar to the example depicted in FIG. 5A and FIG. 5B, the first mark M1 and the second mark M2 both indicate that the parity P is stored in the fast physical programming unit of the second physical programming unit 704.

In other words, in the present exemplary embodiment, if the first user data D1-1 cannot be corrected by using the error checking and correcting code ECC1-1 of the first user data D1-1, the memory control circuit unit 104 (or the memory management circuit 202) first obtains the first mark M1 from the fast physical programming unit close to the $0^{th}$ physical programming unit where the first user data D1-1 is located (e.g., the $2^{nd}$ physical programming unit of the physical erasing unit 410(F)) of the first physical programming units 702, and thereby identifies the address for storing the parity P. In another exemplary embodiment, if the first user data D1-2 cannot be corrected by using the error checking and correcting code ECC1-2 of the first user data D1-2 and the first mark M1 cannot be obtained from the first recording area of the redundancy bit area corresponding to the first user data D1-2, the memory control circuit unit 104 (or the memory management circuit 202) searches the fast physical programming units close to the $2^{nd}$ physical programming unit where the first user data D1-2 is located (e.g., the $0^{th}$ physical programming unit of the physical erasing unit 410(F), the $4^{th}$ physical programming unit of the physical erasing unit 410(F) and the $6^{th}$ physical programming unit of the physical erasing unit 410(F)) in order to obtain the second mark M2 located in the fast physical programming unit of the third physical programming unit 706, and thereby identifies the address for storing the parity P.

It is worth mentioning that, in this exemplary embodiment, the physical programming units for recording the address of the physical programming unit to which the parity belongs are the physical programming units which are located before and after the physical programming units to which the parity belongs. Therefore, in case one of the physical programming units for recording the address of the physical programming units to which the parity belongs is damaged (i.e., the data recorded in the data bit areas and the marks and the error checking and correcting codes record in redundancy bit area are lost or damaged in the physical erasing unit), the memory control circuit unit 104 (or the memory management circuit 202) may further identify the address of the physical programming unit to which the parity belongs according to another physical programming unit adjacent to or close to the physical programming unit where the data is read. Accordingly, when the data cannot be corrected by using the error checking and correcting code, the address for storing the parity of the data may be effectively identified by using the marks stored in the physical programming units and the parity may then be obtained, so that the error bits in the data can be corrected by using the obtained parity.

Figure 7:
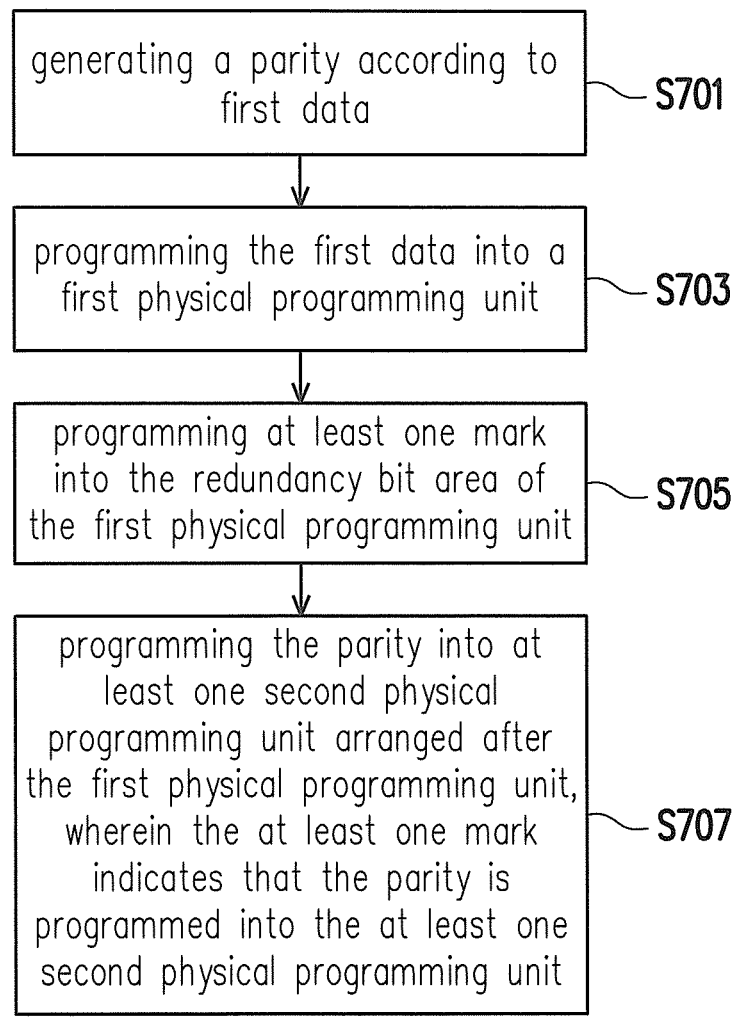
FIG. 7 is a flowchart illustrating a data storing method according to the first exemplary embodiment.

FIG. 7 is a flowchart illustrating a data storing method according to the first exemplary embodiment.

Referring to FIG. 7, in step S701, the memory control circuit unit (or the memory management circuit) generates a parity according to first data. Thereafter, in step S703, the memory control circuit unit (or the memory management circuit) programs the first data into first physical programming units. Subsequently, in step S705, the memory control circuit unit (or the memory management circuit) programs at least one mark into the redundancy bit area of the first physical programming units. In step S707, the memory control circuit unit (or the memory management circuit) programs the parity into at least one second physical programming unit arranged after the first physical programming units, wherein the at least one mark indicates that the parity is programmed into the at least one second physical programming unit.

[Second Exemplary Embodiment]

A memory storage device and a host system of the second exemplary embodiment are substantially identical to the memory storage device and the host system of the first exemplary embodiment. A difference between the two is that the memory control circuit unit (or memory management circuit) of the second exemplary embodiment establishes a parity address correspondence table, and the physical programming unit and the parity address correspondence table are used together to record the address of the physical programming units to which one parity belongs. The difference between the first exemplary embodiment and the second exemplary embodiment is described below by reference with device structures depicted in FIG. 1A, FIG. 2 and FIG. 3.

Figure 8A:
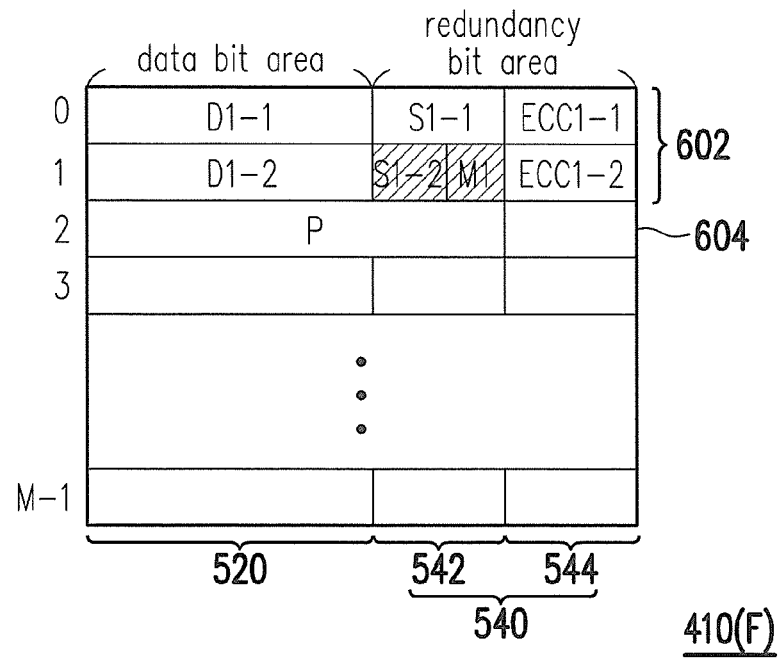
FIG. 8A and FIG. 8B illustrate an example of writing the writing data, the error checking and correcting code corresponding to the writing data and the at least one mark for recording the parity into the physical programming units according to the second exemplary embodiment.
Figure 8B:
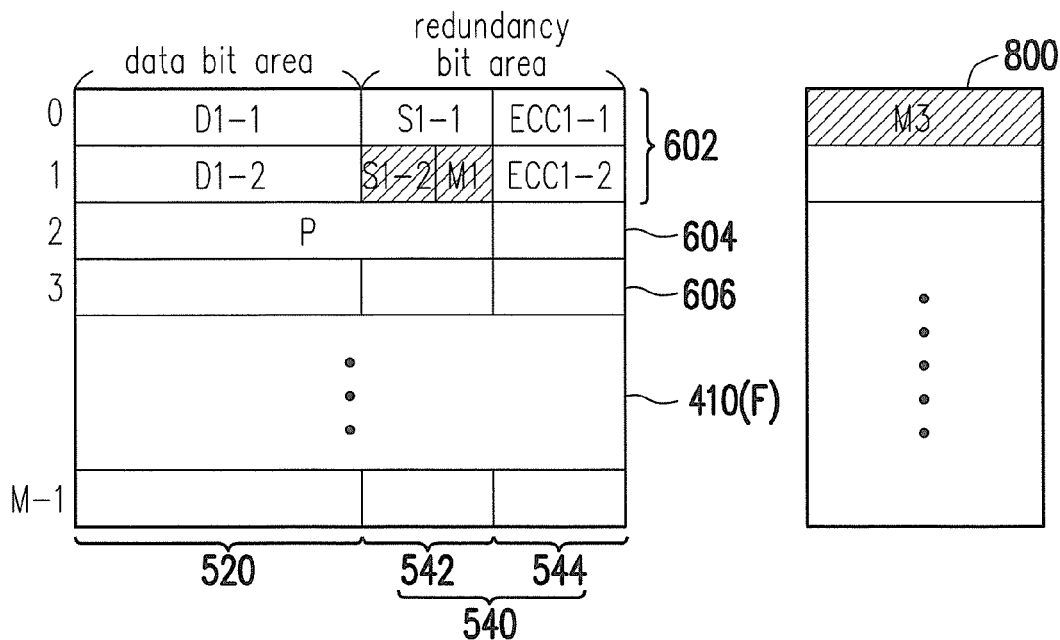

FIG. 8A and FIG. 8B illustrate an example of writing the writing data, the error checking and correcting code corresponding to the writing data and the at least one mark for recording the parity into the physical programming units according to the second exemplary embodiment.

Referring to FIG. 8A and FIG. 8B, a method of writing first user data, an error checking and correcting code corresponding to the first user data, a first mark for recording an address of a parity and the parity corresponding to the first user data and management information thereof into the physical programming unit as depicted in FIG. 8A is identical to the method depicted in FIG. 5A, which are not repeated hereinafter. The difference is that, in the present exemplary embodiment, in the operations of programming the first user data D1-1 and D1-2 and the error checking and correcting codes ECC1-1 and ECC1-2 corresponding to the first user data D1-1 and D1-2 into the first physical programming unit 602 among the physical programming units, and programming the parity P corresponding to the first user data D1-1 and D1-2 and the management information S1-1 and S1-2 thereof into the second physical programming unit 604 among the physical programming units, the memory control circuit unit 104 (or the memory management circuit 202) establishes a parity address correspondence table 800 (as shown in FIG. 8B). For example, the parity address correspondence table 800 is stored in the buffering memory 208 or the random access memory 1104. Particularly, the memory control circuit unit 104 (or the memory management circuit 202) records a third mark M3 into the parity address correspondence table 800, wherein the third mark M3 also indicates that the parity P is stored in the second physical programming unit 604.

In the present exemplary embodiment, after the operations of programming the first user data D1-1 and D1-2 and the error checking and correcting codes ECC1-1 and ECC1-2 corresponding to the first user data D1-1 and D1-2 into the first physical programming unit 602 among the physical programming units, and programming the parity P corresponding to the first user data D1-1 and D1-2 and the management information S1-1 and S1-2 thereof into the second physical programming unit 604 among the physical programming units as shown in FIG. 8A, the host system 1000 again sends another write command and the second user data D2 corresponding to that write command to the memory storage device 100. In this case, before the memory control circuit unit 104 (or the memory management circuit 202) writes the second user data, the management information corresponding to the second user data, the third mark M3 indicating that the parity P is located in the second physical programming unit 604 and the error checking and correcting code corresponding to the second user data into the third physical programming unit 606, if power failure occurs on the host system 1000 or the memory storage device 100, the third mark M3 for recording the address where the parity P is located cannot be written into the third physical programming unit 606, or the data in the first physical programming unit 602 may be lost or damaged.

In case the third physical programming unit 606 arranged after the second physical programming unit 604 becomes an empty physical programming unit or the data in the first physical programming unit 602 is lost or damaged due to power failure as described above, when the memory control circuit unit 104 (or the memory management circuit 202) receives the read command sent from the host system 1000 for reading the first user data D1-1 and D1-2, the memory control circuit unit 104 (or the error checking and correcting circuit 212) may perform the error checking and correcting procedure on the first user data D1-1 and D1-2 according to the read error checking and correcting code. If the first user data D1-1 and D1-2 cannot be corrected by using the error checking and correcting code (i.e., ECC1-1, ECC1-2) corresponding to the first user data D1-1 and D1-2, the memory control circuit unit 104 (or the memory management circuit 202) is further configured to obtain an address of the second physical programming unit 604 recording the parity P according to the at least one mark, read the parity P from the second physical programming unit 604, and correct the first user data D1-1 and D1-2 according the read parity P. For instance, the memory management circuit 202 first determines whether the first recording area of the redundancy bit area of the physical erasing unit 410(F) corresponding to the first user data D1-2 includes the first mark M1. If the first mark M1 is included and the address where the parity P is located may be obtained accordingly, the memory control circuit unit 104 (or the memory management circuit 202)

may correct the first user data D1-1 or D1-2 according to the parity P. Otherwise, if the first mark is not included or the redundancy bit area recording the first mark M1 is damaged, the memory management circuit 202 reads the parity address correspondence table 800 and obtains the address of the physical programming unit where the parity P is located according to the third mark M3 in the parity address correspondence table 800.

[Third Exemplary Embodiment]

A memory storage device and a host system of the third exemplary embodiment are substantially identical to the memory storage device and the host system of the first exemplary embodiment. A difference between the two is that the memory control circuit unit (or memory management circuit) of third exemplary embodiment records mark values into the physical programming units according to an amount of the physical programming units required for writing each data, and obtains the address of the physical programming unit to which the parity belongs according to the mark values. The difference between the first exemplary embodiment and the third exemplary embodiment is described below by reference with device structures depicted in FIG. 1A, FIG. 2 and FIG. 3.

As identical to the first exemplary embodiment, when the host system 1000 sends the write command and the first user data D1 corresponding to the write command to the memory storage devices 100, the memory control circuit unit 104 (or the memory management circuit 202) determines a size of the first user data D1, and obtains an amount of the physical programming units required for writing the first user data D1 according to the size of the first user data D1. Herein, it is assumed that four physical programming units are required for writing the first user data D1. In this example, the memory control circuit unit 104 (or the memory management circuit 202) generates error checking and correcting codes ECC1-1 to ECC1-4 corresponding to the first user data D1-1 to D1-4 and management information S1-1 to S1-4 corresponding to the first user data D1-1 to D1-4. Particularly, when the first user data D1 is received by the memory control circuit unit 104 (or the memory management circuit 202), the first user data D1 is not instantly written into the physical erasing unit. For instance, the memory control circuit unit 104 (or the memory management circuit 202) waits for the host system 1000 to send other write commands together with the second user data D2 and third user data D3 corresponding to the write command to the memory storage device 100, and counts amounts of the physical programming units required for writing the second user data D2 and the third user data D3. Herein, it is assumed that, each time after writing three physical programming units, the memory control circuit unit 104 (or the memory management circuit 202) of the present exemplary embodiment generates one parity for the data in the three physical programming units. In the present exemplary embodiment, the memory control circuit unit 104 (or the memory management circuit 202) deter nines that the amounts of the physical programming units required for writing the second user data D2 and the third user data D3 are both two, and the memory control circuit unit 104 (or the memory management circuit 202) also arranges the data to be written each of the physical programming units in an order as shown by an arrangement 900 in FIG. 9 according to the amount of the physical programming units required for writing each data and a sequence of the data being received.

In another exemplary embodiment, it is also possible that, each time after writing three or more (or three or less) physical programming units, one parity is generated for the data in the three or more (or three or less) physical programming units, which is not particularly limited in the present invention. In addition, the number of the other write commands and the number of the data corresponding to the write commands that the memory control circuit unit 104 (or the memory management circuit 202) waits for the host system 1000 to send are not limited only to three.

Figure 9:
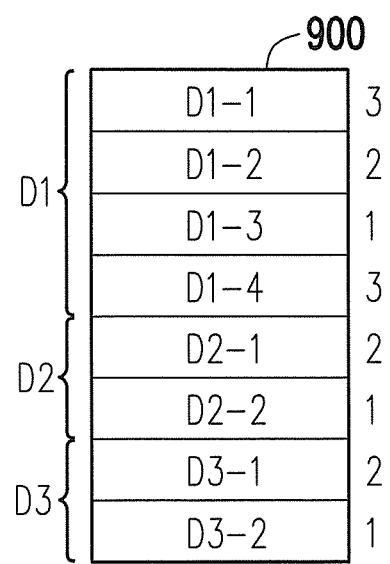
FIG. 9 illustrates an example of arranging the physical programming units and recording the mark values according an amount of the physical programming units to be written by the writing data according to the third exemplary embodiment.
Figure 10:
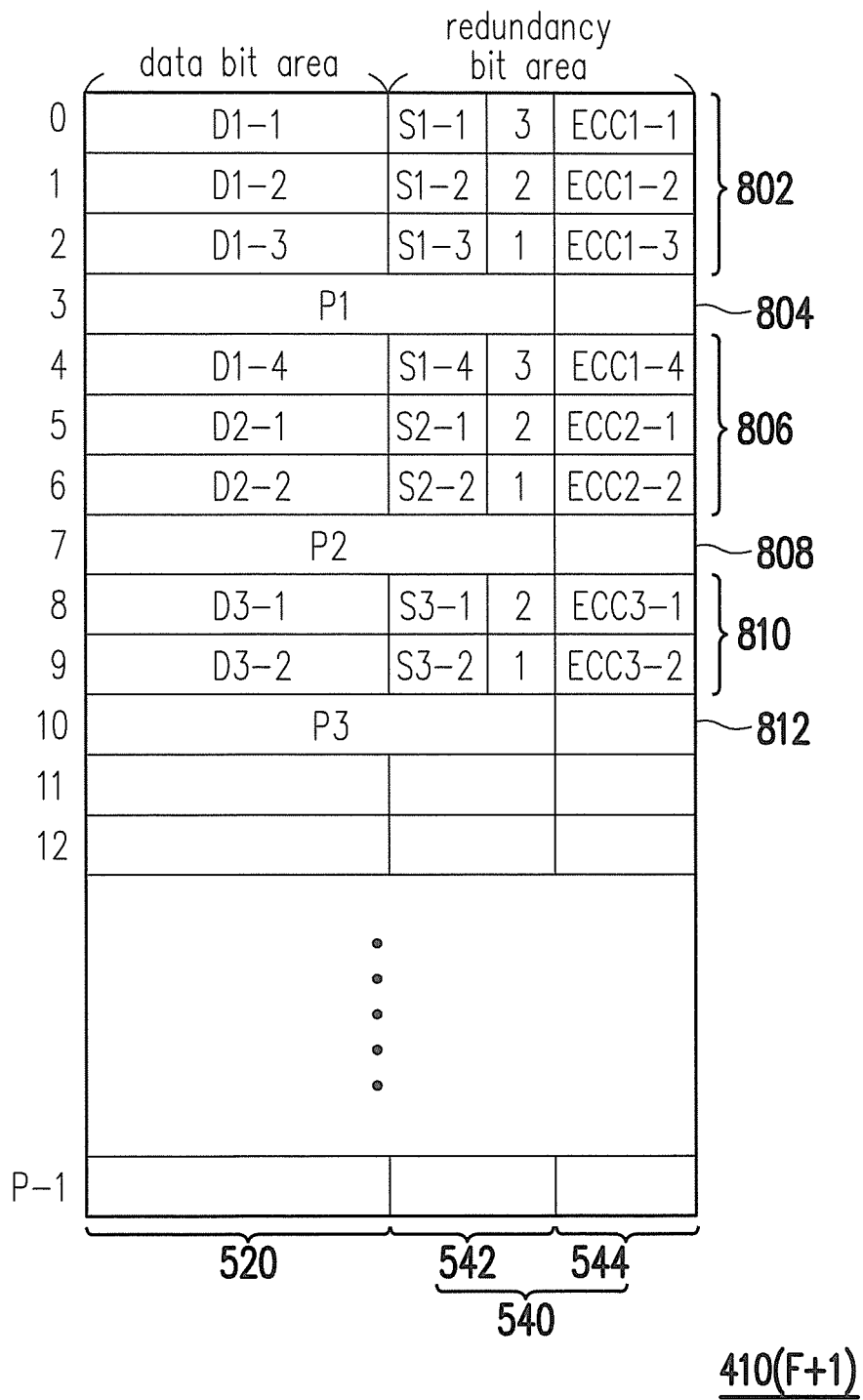
FIG. 10 illustrates another example of writing the writing data, the error checking and correcting code corresponding to the writing data and the at least one mark for recording the parity into the physical programming units according to the third exemplary embodiment.

FIG. 9 illustrates an example of arranging the physical programming units and recording the mark values according an amount of the physical programming units to be written by the writing data according to the third exemplary embodiment, and FIG. 10 illustrates another example of writing the writing data, the error checking and correcting code corresponding to the writing data and the at least one mark for recording the parity into the physical programming units according to the third exemplary embodiment.

Referring to FIG. 9, as described above, each time after writing three physical programming units, the memory control circuit unit 104 (or the memory management circuit 202) of the present exemplary embodiment generates one parity for the data in the three physical programming units. Therefore, the memory control circuit unit 104 (or the memory management circuit 202) may further record a mark value for the data to be written into each of the physical programming units according to the arrangement 900. Specifically, the mark value of the first user data D1-1 is recorded as 3; the mark value of the first user data D1-2 is recorded as 2; the mark value of the first user data D1-3 is recorded as 1; the mark value of the first user data D1-4 is recorded as 3; and the mark value of the second user data D2-1 is recorded as 2 and the mark value of the second user data D2-2 is recorded as 1. Particularly, the physical programming units required for writing the rest of the third user data D3 are only two. Accordingly, the memory management circuit 202 records the mark value of third user data D3-1 as 2, and records the mark value of third user data D3-2 as 1.

Thereafter, the memory control circuit unit 104 (or the memory management circuit 202) selects the physical erasing unit 410(F+1) from the spare area 504 to serve as a substitute physical programming unit, and sequentially writes the data, the management information corresponding to the data, and the error checking and correcting codes corresponding to the data into the physical erasing unit 410(F+1) according to the arrangement depicted in FIG. 9.

Referring to FIG. 10, the memory control circuit unit 104 (or the memory management circuit 202) sequentially writes the first user data D1-1 to D1-3, the management information S1-1 to S1-3 corresponding to the first user data and the error checking and correcting codes ECC1-1 to ECC1-3 corresponding to the first user data into $0^{th}$ to $2^{nd}$ physical programming units of the physical erasing unit 410(F+1). While the memory control circuit unit 104 (or the memory management circuit 202) is writing the management information S1-1 to S1-3 corresponding to the first user data D1-1 to D1-3 into the first recording areas of the redundancy bit areas of the $0^{th}$ to $2^{nd}$ physical programming units of the physical erasing unit 410(F+1), the memory control circuit unit 104 (or the memory management circuit 202), according to the mark values previously recorded for the first user data D1-1 to D1-3, records said mark values into the first areas of the redundancy bit areas of the physical programming units corresponding to the first user data D1-1 to D1-3. Further, the memory control circuit unit 104 (or the memory management circuit 202) generates a first parity P1 corresponding to the first user data D1-1 to D1-3 and the management information S1-1 to S1-3 corresponding to the first user data D1-1 to D1-3. For instance, it assumed herein that the $0^{th}$ to $2^{nd}$ physical programming units in the physical erasing unit 410(F+1) written by the first user data D1-1 to D1-3 are a first physical programming unit 802. Accordingly, the memory management circuit 202 writes the first parity P1 corresponding to the first user data D1-1 to D1-3 and the management information S1-1 to S1-3 thereof into a $3^{rd}$ physical programming unit of the physical erasing unit 410(F+1). Herein, it is further assumed that the $3^{rd}$ physical programming unit of the physical erasing unit 410(F+1) is a second physical programming unit 804. That is, the memory control circuit unit 104 (or the memory management circuit 202) writes the first parity P1 corresponding to the first user data D1-1 to D1-3 and the management information S1-1 to S1-3 thereof into the second physical programming unit 804 arranged after a last one physical programming unit of the first physical programming unit 802 (i.e., the $2^{nd}$ physical programming unit of the physical erasing unit 401(F+1)). Further, by analogy, the memory control circuit unit 104 (or the memory management circuit 202) successively uses the first user data D1-4, the second user data D2-1 and the second user data D2-2 as a group according to the arrangement 900 in FIG. 9, and writes three management information, three error checking and correcting codes and the parity corresponding to aforesaid data to be written into three physical programming units, respectively and sequentially, into a third physical programming unit 806 and a fourth physical programming unit 808 of the physical erasing unit 410(F+1). Particularly, the amount of the physical programming units required for writing the rest of the third user data D3 is two. Therefore, the memory control circuit unit 104 (or the memory management circuit 202) only uses the third user data D3-1 and the third user data D3-2 as a group, and writes two management information, two error checking and correcting codes and the parity corresponding to the data to be written into two physical programming units, respectively and sequentially, into a fifth physical programming unit 810 and a sixth physical programming unit 812 of the physical erasing unit 410(F+1).

Specifically, in the physical erasing unit 410(F+1), a first mark value located in the first physical programming unit 802 is 1, a second mark value located in the third physical programming unit 806 is 2, and the third value located in the fifth physical programming unit 810 is 3. Referring back to FIG. 10, the first mark value is recorded in the first recording area of the redundancy bit area of the last one physical programming unit of the first physical programming unit 802 (i.e., a $2^{nd}$ physical programming unit of the physical erasing unit 410(F+1)); the second mark value is recorded in the redundancy bit area of the physical programming unit adjacent to and arranged before the last one physical programming unit of the first physical programming unit 802 (i.e., a $1^{st}$ physical programming unit of the physical erasing unit 410(F+1)); and the third mark value is recorded in the redundancy bit area of the physical programming unit adjacent to and arranged before the physical programming unit recording the second mark value of the first physical programming unit 802 (i.e., a $0^{th}$ physical programming unit of the physical erasing unit 410(F+1)). By analogy, the mark values in the third physical programming unit 806 are also arranged in the same arrangement depicted in FIG. 10. It is worth mentioning that, because only two physical programming units are required for writing the third user data D3, the fifth physical programming unit 810 only includes the first mark value and the second mark value.

Thereafter, if the memory control circuit unit 104 (or the memory management circuit 202) receives the read command sent from the host system 1000 for reading the first user data D1, the memory control circuit unit 104 (or the error checking and correcting circuit 212) may perform the error checking and correcting procedure on the first user data D1 according to the read error checking and correcting code. If the first user data D1-1 to D1-4 cannot be corrected by using the error checking and correcting code (i.e., ECC1-1 to ECC1-4) corresponding to the first user data D1-1 to D1-4, the memory control circuit unit 104 (or the memory management circuit 202) may obtain addresses of the physical programming units recording the first parity P1 and a second parity P2 according to the at least one mark. Herein, it is assumed that the first user data D1-2 cannot be corrected by using the error checking and correcting code ECC1-2 of the first user data and the second mark value cannot be obtained from the first recording area of the redundancy bit area corresponding to the first user data D1-2. In this case, the memory control circuit unit 104 (or the memory management circuit 202) may obtain at least one mark value from the physical programming unit adjacent to the $1^{st}$ physical programming unit where the first user data D1-2 is located (e.g., the $0^{th}$ or $2^{nd}$ physical programming units of the physical erasing unit 410(F+1)) of the first physical programming unit 802. Herein, it is assumed that the mark value obtained by the memory control circuit unit 104 (or the memory management circuit 202) from the redundancy bit area of the $2^{nd}$ physical programming unit of the first physical programming unit 802 is 1. In this case, the memory control circuit unit 104 (or the memory management circuit 202) determines that the address where the first parity P1 corresponding to the first user data D1-1 to D1-3 is located is the physical programming unit adjacent to the last one physical programming unit of the first physical programming unit 802 (i.e., the second physical programming unit 804). Further, the memory control circuit unit 104 (or the memory management circuit 202) reads the first parity P1 and corrects the first user data D1 according to the read first parity P1. In addition, it is further assumed that the mark value obtained by the memory control circuit unit 104 (or the memory management circuit 202) from the $0^{th}$ physical programming unit of the first physical programming unit 802 is 3. In this case, the memory control circuit unit 104 (or the memory management circuit 202) determines that the address where the first parity P1 corresponding to the first user data D1-1 to D1-3 is located is the second physical programming unit 804 which is spaced by three physical programming units from itself (i.e., the $0^{th}$ physical programming unit of the first physical programming unit 802). Subsequently, the memory control circuit unit 104 (or the memory management circuit 202) reads the first parity P1 and corrects the first user data D1 according to the read first parity P1. Accordingly, if the data in each physical programming unit cannot be corrected by the respective error checking and correcting code or the area for recording the mark value corresponding to the data of each physical programming unit is damaged, the memory control circuit unit 104 (or the memory management circuit 202) may obtain the mark values for indicating the address of the parity from the adjacent physical programming units. As a result, the situation where the read data cannot be corrected may be effectively prevented.

[Fourth Exemplary Embodiment]

A memory storage device and a host system of the fourth exemplary embodiment are substantially identical to the memory storage device and the host system of the first exemplary embodiment. A difference between the two is that the memory control circuit unit (or memory management circuit) of the fourth exemplary embodiment establishes a parity address correspondence table, and the parity address correspondence table is used to record the address of the physical programming unit to which each parity belongs. The difference between the first exemplary embodiment and the fourth exemplary embodiment is described below by reference with device structures depicted in FIG. 1A, FIG. 2 and FIG. 3.

Figure 11:
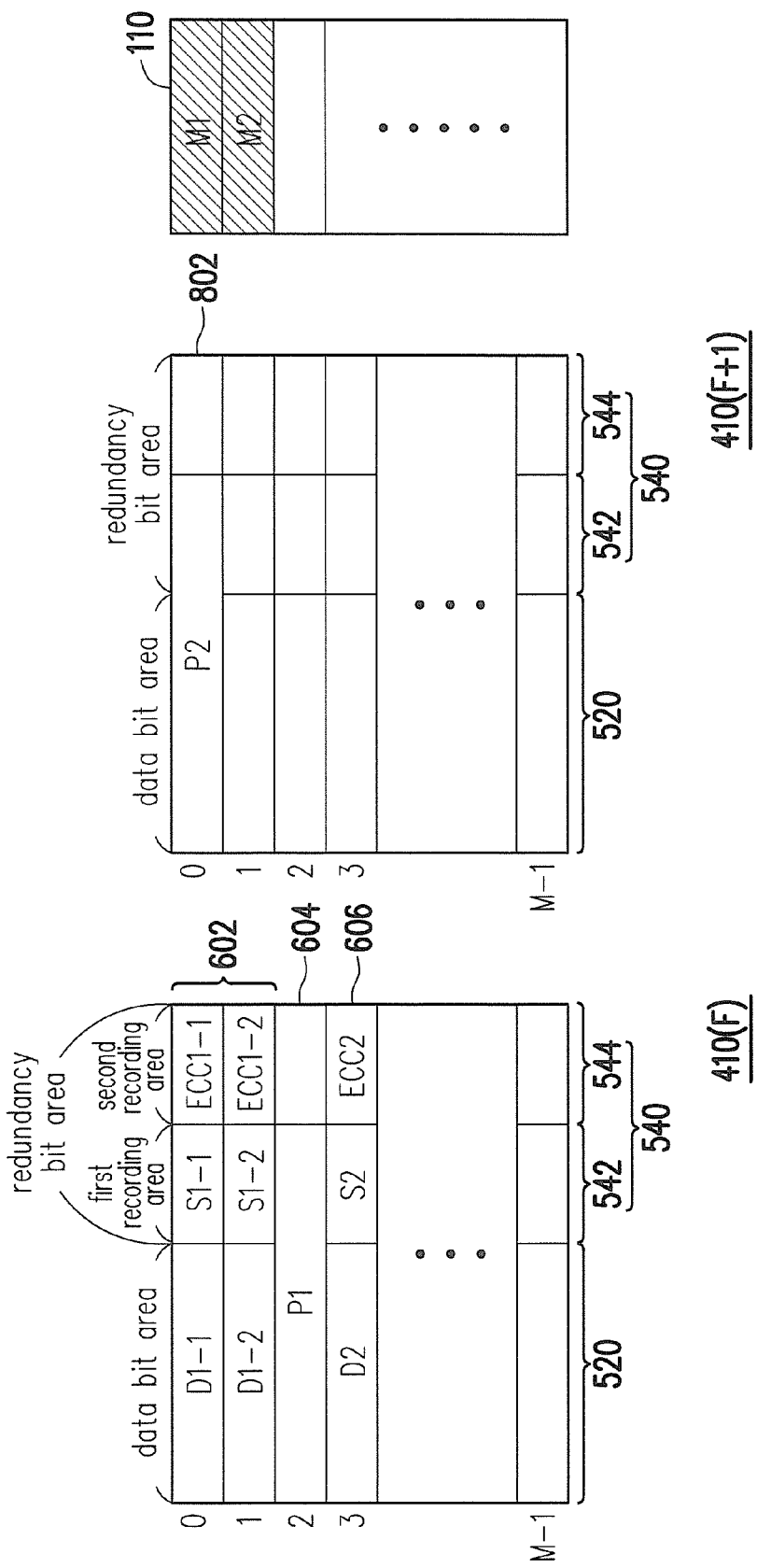
FIG. 11 illustrates an example of recording the writing data, the error checking and correcting code corresponding to the writing data and the at least one mark into the parity address correspondence table according to the fourth exemplary embodiment.

FIG. 11 illustrates an example of recording the writing data, the error checking and correcting code corresponding to the writing data and the at least one mark into the parity address correspondence table according to the fourth exemplary embodiment.

Referring to FIG. 11, a method of writing first user data, an error checking and correcting code corresponding to the first user data, and the parity corresponding to the first user data into the physical programming unit as depicted in FIG. 11 is identical to the method depicted in FIG. 5A and FIG. 5B of first exemplary embodiment, which are not repeated hereinafter. A difference between the two is that, in the present exemplary embodiment, the memory control circuit unit 104 (or the memory management circuit 202) establishes a parity address correspondence table 110 in advance, and the parity address correspondence table 100 is stored in the buffering memory 208 or the random access memory 1104. Further, in the operations of programming the first data D1-1 and D1-2, the management information S1-1 and S1-2 corresponding to the first user data D1-1 and D1-2 and the error checking and correcting codes ECC1-1 and ECC1-2 corresponding to the first user data D1-1 and D1-2 into the first physical programming unit 602 among the physical programming units, and programming the first parity P1 corresponding to the first users D1-1 and D1-2 and the management information S1-1 and S1-2 corresponding to the first user data D1-1 and D1-2 into the second physical programming unit 604 among the physical programming units by the memory control circuit unit 104 (or the memory management circuit 202), instead of programming the first mark M1 for recording the address of the first parity P1 into at least one physical programming unit of the first physical programming unit 602, the memory control circuit unit 104 (or the memory management circuit 202) records the first mark M1 in the parity address correspondence table 110 previously established. In another exemplary embodiment, when the host system 1000 sends another write command and the second user data D2 corresponding to that write command to the memory storage device 100, the memory control circuit unit 104 (or the memory management circuit 202) writes the second user data D2 and the generated error checking and correcting code ECC2 corresponding to the second user data D2 and the management information S2 corresponding to the second user data D2 into the third physical programming unit 606 of the physical erasing unit 410(F). Particularly, the memory control circuit unit 104 (or the memory management circuit 202) may additionally select one physical erasing unit 410(F+1), and program the second parity P2 corresponding to the second user data D2 and the management information S2 thereof into the first physical programming unit 802 of the physical erasing unit 410(F+1). In addition, the memory control circuit unit 104 (or the memory management circuit 202) also records the second mark M2 for recording the address of the second parity P2 into the parity address correspondence table 110. It is worth mentioning that, in the present exemplary embodiment, the physical erasing unit for storing the parity is not particularly limited. That is, the physical erasing unit selected by the memory control circuit unit 104 (or the memory management circuit 202) for recording the parity may also be a memory die different from the memory die corresponding to the physical erasing unit where the writing data corresponding to the parity is located. In other words, when the first user data D1-1 and D1-2 cannot be corrected by using the error checking and correcting codes ECC1-1 and ECC1-2 of the first user data D1-1 and D1-2, the memory control circuit unit 104 (or the memory management circuit 202) may obtain the first mark M1 for recording the address of the first parity P1 according to the parity address correspondence table 110. Alternatively, when the second user data D2 cannot be corrected by using the error checking and correcting code ECC2 of the second user data D2, the memory control circuit unit 104 (or the memory management circuit 202) may obtain the second mark M2 for recording the address of the second parity P2 according to the parity address correspondence table 110. Accordingly, the memory control circuit unit 104 (or the memory management circuit 202) is capable of rapidly obtaining the physical programming unit to which the parity belongs according to the parity address correspondence table 110.

Figure 12:
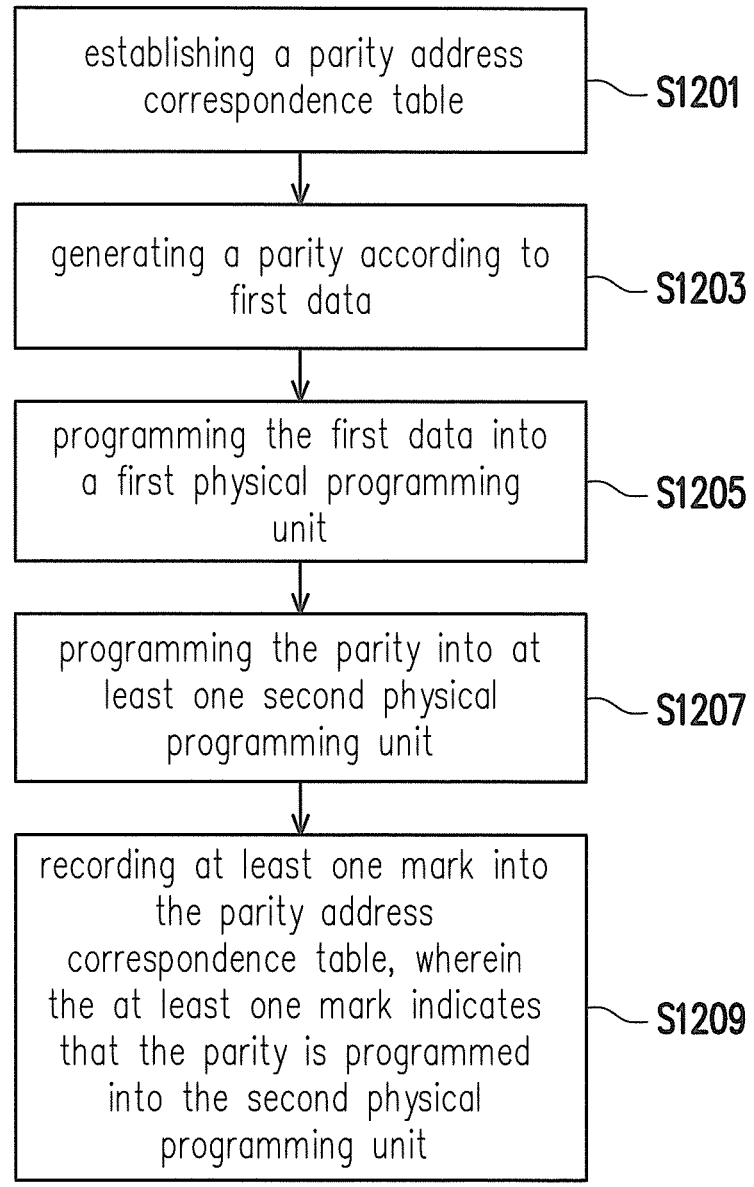
FIG. 12 is a flowchart illustrating a data storing method according to the fourth exemplary embodiment.

FIG. 12 is a flowchart illustrating a data storing method according to fourth exemplary embodiment.

Referring to FIG. 12, in step S1201, the memory control circuit unit (or the memory management circuit) establishes a parity address correspondence table. In step S1203, the memory control circuit unit (or the memory management circuits) generates a parity according to first data. Subsequently, in step S1205, the memory control circuit unit (or the memory management circuit) programs the first data into first physical programming units. In step S1207, the memory control circuit unit (or the memory management circuit) programs the parity into at least one second physical programming unit. Thereafter, in step S1209, the memory control circuit unit (or the memory management circuit) records at least one mark into the parity address correspondence table, wherein the at least one mark indicates that the parity is programmed into the second physical programming unit.

In summary, according to the data storing method, the memory control circuit unit and the memory storage device in the exemplary embodiments of the invention, while writing the data, the address of the parity corresponding to the data are recorded into at least one mark, and the at least one mark is written into the at least one physical programming unit to be written by the received data. Accordingly, when errors exist in the data bits read from the rewritable non-volatile memory module, according to the at least one mark, the physical programming unit to which the parity belongs can be rapidly obtained, so as to effectively improve the correcting capability and performance in error collections. In addition, according to the exemplary embodiments of the invention, the physical programming unit written with the parity for correcting the read data is arranged after the physical programming unit written with the data. Accordingly, the data storing method according to the exemplary embodiments of the invention does not require placing the parity corresponding to a plurality of data into a fixed memory die in the system, so as to effectively avoid waste of storage spaces in the memory storage device. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data storing method for a rewritable non-volatile memory module comprising a plurality of physical erasing units, wherein each of the physical erasing units comprising a plurality of physical programming units and each of the physical programming units comprises a data bit area and a redundancy bit area, the data storing method comprising:
generating a parity according to first data;
programming the first data into a first physical programming unit among the physical programming units; and
programming the parity into at least one second physical programming unit among the physical programming units, wherein the at least one second physical programming unit is arranged after the first physical programming unit,
wherein the step of programming the first data into the first physical programming unit among the physical programming units comprises: programming at least one mark into the redundancy bit area of the first physical programming unit, wherein the at least one mark indicates that the parity is programmed into the at least one second physical programming unit.

2. The data storing method of claim 1, wherein the first data comprises user data and management information corresponding to the user data,
wherein the user data is programmed into the data bit area of the first physical programming unit, wherein the management information corresponding to the user data is programmed into the redundancy bit area of the first physical programming unit.

3. The data storing method of claim 1, wherein the first data comprises user data, management information corresponding to the user data and an error checking and correcting code corresponding to the user data,
wherein the error checking and correcting code is generated according to the user data,
wherein the user data is programmed into the data bit area of the first physical programming unit, wherein the management information corresponding to the user data is programmed into the redundancy bit area of the first physical programming unit, wherein the error checking and correcting code corresponding to the user data is programmed into the redundancy bit area of the first physical programming unit.

4. The data storing method of claims 2 or 3, wherein the step of programming the at least one mark into the redundancy bit area of the first physical programming unit comprises:
programming a first mark into the redundancy bit area of a last one physical programming unit of the first physical programming unit, wherein the at least one second physical programming unit is arranged after the last one physical programming unit of the first physical programming unit, wherein the first mark indicates that the parity is stored in the at least one second physical programming unit; and
programming a second mark into the redundancy bit area of at least one third physical programming unit among the physical programming units, wherein the at least one third physical programming unit is arranged after the at least one second physical programming unit, wherein the second mark indicates that the parity is stored in the at least one second physical programming unit.

5. The data storing method of claim 4, wherein the step of programming the at least one mark into the redundancy bit area of the first physical programming unit further comprises:
establishing a parity address correspondence table; and
recording a third mark into the parity address correspondence table, wherein the third mark indicates that the parity is stored in the at least one second physical programming unit.

6. The data storing method of claim 1, wherein the step of programming the at least one mark into the redundancy bit area of the first physical programming unit comprises:
counting an amount of the first physical programming unit; and
recording a mark value into the redundancy bit area of each of the first physical programming unit according to the amount of the first physical programming unit, wherein the mark values recorded in the first physical programming unit are sequentially decreasing according to an arrangement of the first physical programming unit.

7. The data storing method of claim 6, wherein a first mark value among the mark values is 1, the first mark value is recorded into the redundancy bit area of a last one physical programming unit of the first physical programming unit, and the at least one second physical programming unit is arranged after the last one physical programming unit of the first physical programming unit,
wherein a second mark value among the mark value is 2, and the second mark value is recorded into the redundancy bit area of the physical programming unit adjacent to and arranged before the last one physical programming unit of the first physical programming unit,
wherein a third mark value among the mark value is 3, and the third mark value is recorded into the redundancy bit area of the physical programming unit adjacent to and arranged before the physical programming unit storing the second mark value among the first physical programming unit.

8. The data storing method of claim 1, wherein the first data comprises second data and an error checking and correcting code, and the data storing method further comprises:
when the second data cannot be corrected by using the error checking and correcting code, obtaining an address of the at least one second physical programming unit recording the parity according to the at least one mark, reading the parity from the at least one second physical programming unit, and correcting the second data according the read parity.

9. A data storing method for a rewritable non-volatile memory module comprising a plurality of physical erasing units, wherein each of the physical erasing units comprising a plurality of physical programming units, wherein each of the physical programming units comprises a data bit area and a redundancy bit area, and the data storing method comprising:
establishing a parity address correspondence table;
generating a parity according to first data;
programming the first data into a first physical programming unit among the physical programming units;

programming the parity into at least one second physical programming unit among the physical programming units; and recording at least one mark into the parity address correspondence table, wherein the at least one mark indicates that the parity is programmed into the at least one second physical programming unit.

10. A memory control circuit unit for controlling a rewritable non-volatile memory module, wherein the rewritable non-volatile memory module comprises a plurality of physical erasing units, each of the physical erasing units comprises a plurality of physical programming units, and each of the physical programming units comprises a data bit area and a redundancy bit area, the memory control circuit unit comprising:

a host interface configured to couple to a host system;

a memory interface configured to couple to the rewritable non-volatile memory module; and a memory management circuit coupled to the host interface and the memory interface, wherein the memory management circuit is configured to generate a parity according to first data, wherein the memory management circuit is further configured to program the first data into a first physical programming unit among the physical programming units, wherein the memory management circuit is further configured to program the parity into at least one second physical programming unit among the physical programming units, wherein the at least one second physical programming unit is arranged after the first physical programming unit, wherein in the operation of programming the first data into the first physical programming unit among the physical programming units, the memory management circuit programs at least one mark into the redundancy bit area of the first physical programming unit, wherein the at least one mark indicates that the parity is programmed into the at least one second physical programming unit.

11. A memory storage device, comprising:

a connection interface unit configured to couple to a host system;

a rewritable non-volatile memory module comprising a plurality of physical erasing units, wherein each of the physical erasing units comprises a plurality of physical programming units, and each of the physical programming units comprises a data bit area and a redundancy bit area; and a memory control circuit unit coupled to the connection interface unit and the rewritable non-volatile memory module, wherein the memory control circuit unit is configured to generate a parity according to first data, wherein the memory control circuit unit is further configured to program the first data into first physical programming unit among the physical programming units, wherein the memory control circuit unit is further configured to program the parity into at least one second physical programming unit among the physical programming units, wherein the at least one second physical programming unit is arranged after the first physical programming unit, wherein in the operation of programming the first data into the first physical programming unit among the physical programming units, the memory control circuit unit programs at least one mark into the redundancy bit area of the first physical programming unit, wherein the at least one mark indicates that the parity is programmed into the at least one second physical programming unit.

12. The memory storage device of claim 11, wherein each of the first data comprises user data and management information corresponding to the user data, wherein the user data is programmed into the data bit area of the first physical programming unit, wherein the management information corresponding to the user data is programmed into the redundancy bit area of the first physical programming unit.

13. The memory storage device of claim 11, wherein the first data comprises user data, management information corresponding to the user data and an error checking and correcting code corresponding to the user data, wherein the error checking and correcting code is generated according to the user data, wherein the user data is programmed into the data bit area of the first physical programming unit, wherein the management information corresponding to the user data is progranuned into the redundancy bit area of the first physical programming unit, wherein the error checking and correcting code corresponding to the user data is programmed into the redundancy bit area of the first physical programming unit.

14. The memory storage device of claims 12 or 13, wherein in the operation of programming the at least one mark into the redundancy bit area of the first physical programming unit, the memory control circuit unit programs a first mark into the redundancy bit area of a last one physical programming unit of the first physical programming unit, wherein the at least one second physical programming unit is arranged after the last one physical programming unit of the first physical programming unit, wherein the first mark indicates that the parity is stored in the at least one second physical programming unit, wherein the memory control circuit unit is further configured to program a second mark into the redundancy bit area of at least one third physical programming unit among the physical programming units, wherein the at least one third physical programming unit is arranged after the at least one second physical programming unit, wherein the second mark indicates that the parity is stored in the at least one second physical programming unit.

15. The memory storage device of claim 14, wherein in the operation of programming the at least one mark into the redundancy bit area of the first physical programming unit, the memory control circuit unit establishes a parity address correspondence table, and records a third mark into the parity address correspondence table, wherein the third mark indicates that the parity is stored in the at least one second physical programming unit.

16. The memory storage device of claim 11, wherein in the operation of programming the at least one mark into the redundancy bit area of the first physical programming unit, the memory control circuit unit counts an amount of the first physical programming unit and records a mark value in the redundancy bit area of each of the first physical programming unit according to the amount of the first physical programming unit, wherein the mark values recorded in the first physical programming unit are sequentially decreasing according to an arrangement of the first physical programming unit.

17. The memory storage device of claim 16, wherein a first mark value among the mark values is 1, the first mark value is recorded into the redundancy hit area of a last one physical programming unit of the first physical programming unit, and the at least one second physical programming unit is arranged after the last one physical programming unit of the first physical programming unit, wherein a second mark value among the mark value is 2, and the second mark value is recorded into the redundancy bit area of the physical programming unit adjacent to and arranged before the last one physical programming unit of the first physical programming unit, wherein a third mark value among the mark values is 3, and the third mark value is recorded into the redundancy bit area of the physical programming unit adjacent to and arranged before the physical programming unit storing the second mark value among the first physical programming unit.

18. The memory storage device of claim 11, wherein the first data comprises second data and an error checking and correcting code, wherein when the second data cannot be corrected by using the error checking and correcting code, the memory control circuit unit is further configured to obtain an address of the at least one second physical programming unit recording the parity according to the at least one mark, read the parity from the at least one second physical programming unit, and correct the second data according the read parity.

* * * * *